United States Patent
Wang

(10) Patent No.: US 11,683,830 B2
(45) Date of Patent: Jun. 20, 2023

(54) USER EQUIPMENT AND METHOD FOR SCHEDULING TIMELINE FOR CANCELLING UPLINK TRANSMISSION

(71) Applicant: FG Innovation Company Limited, Tuen Mun (HK)

(72) Inventor: Hai-Han Wang, Taipei (TW)

(73) Assignee: FG Innovation Company Limited, Tuen Mun (HK)

(*) Notice: Subject to any disclaimer, the term of this patent is extended or adjusted under 35 U.S.C. 154(b) by 8 days.

(21) Appl. No.: 17/382,874

(22) Filed: Jul. 22, 2021

(65) Prior Publication Data
US 2022/0030601 A1 Jan. 27, 2022

Related U.S. Application Data

(60) Provisional application No. 63/055,241, filed on Jul. 22, 2020.

(51) Int. Cl.
*H04W 72/12* (2009.01)
*H04W 72/1268* (2023.01)

(52) U.S. Cl.
CPC ... *H04W 72/1242* (2013.01); *H04W 72/1268* (2013.01); *H04W 72/1289* (2013.01)

(58) Field of Classification Search
CPC ......... H04W 72/1205; H04W 72/1263; H04W 72/1289; H04W 92/18; H04W 72/1242; H04W 72/1268; H04W 72/12; H04W 72/10; H04L 1/1812; H04L 5/00
USPC .......................................................... 370/32
See application file for complete search history.

(56) References Cited

U.S. PATENT DOCUMENTS

| 2019/0159134 A1 | 5/2019 | Wang et al. |
| 2020/0229202 A1* | 7/2020 | Bagheri ............. H04W 72/042 |
| 2021/0168848 A1* | 6/2021 | Chatterjee ......... H04W 72/1242 |
| 2021/0218503 A1* | 7/2021 | Babaei ................. H04L 1/1812 |

(Continued)

FOREIGN PATENT DOCUMENTS

| CN | 110535583 A | 12/2019 |
| CN | 110972317 A | 4/2020 |

(Continued)

OTHER PUBLICATIONS

3rd Generation Partnership Project;Technical Specification Group Radio Access Network;NR;Requirements for support of radio resource management(Release 16);3GPP TS 38.133 V16.4.0 (Jun. 2020).

(Continued)

*Primary Examiner* — Nathan S Taylor
(74) *Attorney, Agent, or Firm* — ScienBiziP, P.C.

(57) ABSTRACT

A user equipment and a method for scheduling a timeline for cancelling uplink (UL) transmission are provided. The method includes: transmitting a low priority UL channel scheduled by a first downlink control information (DCI) format; receiving a second DCI format scheduling a high priority UL channel; and cancelling transmission of the low priority UL channel and transmitting the high priority UL channel in response to determining that the high priority UL channel overlaps in time with the low priority UL channel, wherein a starting time of the high priority UL channel and an ending time of the second DCI format are separated by an offset greater than an absolute time duration.

15 Claims, 6 Drawing Sheets

400

(56) References Cited

U.S. PATENT DOCUMENTS

| | | | | |
|---|---|---|---|---|
| 2021/0243738 A1* | 8/2021 | Islam | ................ | H04W 72/1268 |
| 2021/0250074 A1* | 8/2021 | Hosseini | ........... | H04W 72/0453 |
| 2021/0258974 A1* | 8/2021 | Hosseini | ........... | H04W 72/1242 |
| 2021/0259010 A1* | 8/2021 | Yang | ................. | H04W 72/1284 |
| 2021/0274470 A1* | 9/2021 | Ryu | ....................... | H04W 76/36 |
| 2021/0410155 A1* | 12/2021 | Khoshnevisan | .... | H04W 72/042 |
| 2022/0394700 A1* | 12/2022 | Ko | .......................... | H04W 4/40 |
| 2023/0006776 A1* | 1/2023 | Yang | ......................... | H04L 1/16 |

FOREIGN PATENT DOCUMENTS

| | | | | |
|---|---|---|---|---|
| CN | 111405662 A | | 7/2020 | |
| WO | WO-2021028873 A1 * | | 2/2021 | ........... H04L 1/1812 |
| WO | WO-2021231507 A1 * | | 11/2021 | |
| WO | WO-2022175876 A1 * | | 8/2022 | |

OTHER PUBLICATIONS

3rd Generation Partnership Project;Technical Specification Group Radio Access Network;NR;Physical channels and modulation(Release 16);3GPP TS 38.211 V16.2.0 (Jun. 2020).

3rd Generation Partnership Project;Technical Specification Group Radio Access Network;NR; Physical layer procedures for control(Release 16);3GPP TS 38.213 V16.1.0 (Mar. 2020).

3rd Generation Partnership Project;Technical Specification Group Radio Access Network;NR;Physical layer procedures for data(Release 16);3GPP TS 38.214 V16.2.0 (Jun. 2020).

* cited by examiner

USER EQUIPMENT AND METHOD FOR SCHEDULING TIMELINE FOR CANCELLING UPLINK TRANSMISSION

CROSS-REFERENCE TO RELATED APPLICATION(S)

The present disclosure claims the benefit of and priority of provisional U.S. Patent Application Ser. No. 63/055,241, filed on Jul. 22, 2020, entitled "SCHEDULING TIMELINE FOR INTRA-UE PRIORITIZATION AND MULTIPLEXING" ("the '241 provisional"). The disclosure of the '241 provisional is hereby incorporated fully by reference into the present disclosure for all purposes.

FIELD

The present disclosure is related to wireless communication, and more particularly, to a user equipment and a method for scheduling timeline for cancelling uplink transmission in the next generation wireless communication networks.

BACKGROUND

Various efforts have been made to improve different aspects of wireless communications, such as data rate, latency, reliability and mobility, for the next generation (e.g., fifth generation (5G) New Radio (NR)) wireless communication systems. In NR, multiple types of services may be supported in a cell, each with different latency and reliability requirements. A user equipment (UE) may have both enhanced mobile broadband (eMBB) and ultra-reliable and low latency communications (URLLC) traffics, so it may be possible that a physical uplink shared channel (PUSCH) transmission for eMBB traffic is on-going when URLLC traffic occurs. In this situation, to guarantee latency requirement for URLLC traffic, the PUSCH transmission for eMBB traffic need to be cancelled for the UE to transmit another PUSCH for URLLC traffic. Thus, there is a need in the industry for an improved and efficient mechanism for a UE to schedule a timeline for cancelling an uplink (UL) transmission.

SUMMARY

The present disclosure is related to a user equipment and a method for scheduling timeline for cancelling uplink transmission in the next generation wireless communication networks.

In a first aspect of the present disclosure, a method performed by a UE for scheduling a timeline for cancelling uplink (UL) transmission is provided. The method includes: transmitting a low priority UL channel scheduled by a first downlink control information (DCI) format; receiving a second DCI format scheduling a high priority UL channel; and cancelling transmission of the low priority UL channel and transmitting the high priority UL channel in response to determining that the high priority UL channel overlaps in time with the low priority UL channel, wherein a starting time of the high priority UL channel and an ending time of the second DCI format are separated by an offset greater than an absolute time duration.

In an implementation of the first aspect of the present disclosure, the absolute time duration includes a first absolute time duration and a second absolute time duration, and the first absolute time duration is determined based on a radio resource control (RRC) configuration and the second absolute time duration is determined based on UE capability information.

In another implementation of the first aspect of the present disclosure, the UE capability information includes a number of symbols, and the second absolute time duration is a length of the number of symbols with a smallest subcarrier spacing (SCS) among an SCS of the first DCI format, an SCS of the second DCI format, an SCS of the low priority UL channel, and an SCS of the high priority UL channel.

In another implementation of the first aspect of the present disclosure, the high priority UL channel is a physical uplink shared channel (PUSCH), the first absolute time duration is determined based on a first type of the processing time of the PUSCH if the RRC configuration includes a configuration of the first type of the processing time of the PUSCH for a first serving cell of the high priority UL channel, and a configuration of the first type of the processing time of a physical downlink shared channel (PDSCH) for a second serving cell of the low priority UL channel, the first type of the processing time of the PUSCH is UE processing capability 2 of the PUSCH, and the first type of the processing time of the PDSCH is UE processing capability 2 of the PDSCH.

In another implementation of the first aspect of the present disclosure, the high priority UL channel is a physical uplink control channel (PUCCH), the first absolute time duration is determined based on a first type of a processing time of a physical uplink shared channel (PUSCH) if the RRC configuration includes a configuration of a first type of the processing time of a physical downlink shared channel (PDSCH) for a first serving cell of the high priority UL channel, and a configuration of the first type of the processing time of the PDSCH for a second serving cell of the low priority UL channel or the first type of the processing time of the PUSCH for a third serving cell of the low priority UL channel, the first type of the processing time of the PUSCH is UE processing capability 2 of the PUSCH, and the first type of the processing time of the PDSCH is UE processing capability 2 of the PDSCH.

In a second aspect of the present disclosure, a UE for scheduling a timeline for cancelling UL transmission is provided. The UE includes one or more non-transitory computer-readable media having computer-executable instructions embodied thereon; and at least one processor coupled to the one or more non-transitory computer-readable media. The at least one processor is configured to execute the computer-executable instructions to: transmit a low priority UL channel scheduled by a first DCI format; receive a second DCI format scheduling a high priority UL channel; and cancel transmission of the low priority UL channel and transmit the high priority UL channel in response to determining that the high priority UL channel overlaps in time with the low priority UL channel, wherein a starting time of the high priority UL channel and an ending time of the second DCI format are separated by an offset greater than an absolute time duration.

In a third aspect of the present disclosure, a method performed by a base station for scheduling a timeline for cancelling UL transmission is provided. The method includes: receiving a low priority UL channel scheduled by a first DCI format; transmitting a second DCI format scheduling a high priority UL channel; and receiving the high priority UL channel, after transmission of the low priority UL channel is canceled and the high priority UL channel is transmitted in response to determining that the high priority UL channel overlaps in time with the low priority UL channel, wherein a starting time of the high priority UL channel and an ending time of the second DCI format are separated by an offset greater than an absolute time duration.

BRIEF DESCRIPTION OF THE DRAWINGS

Aspects of the disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
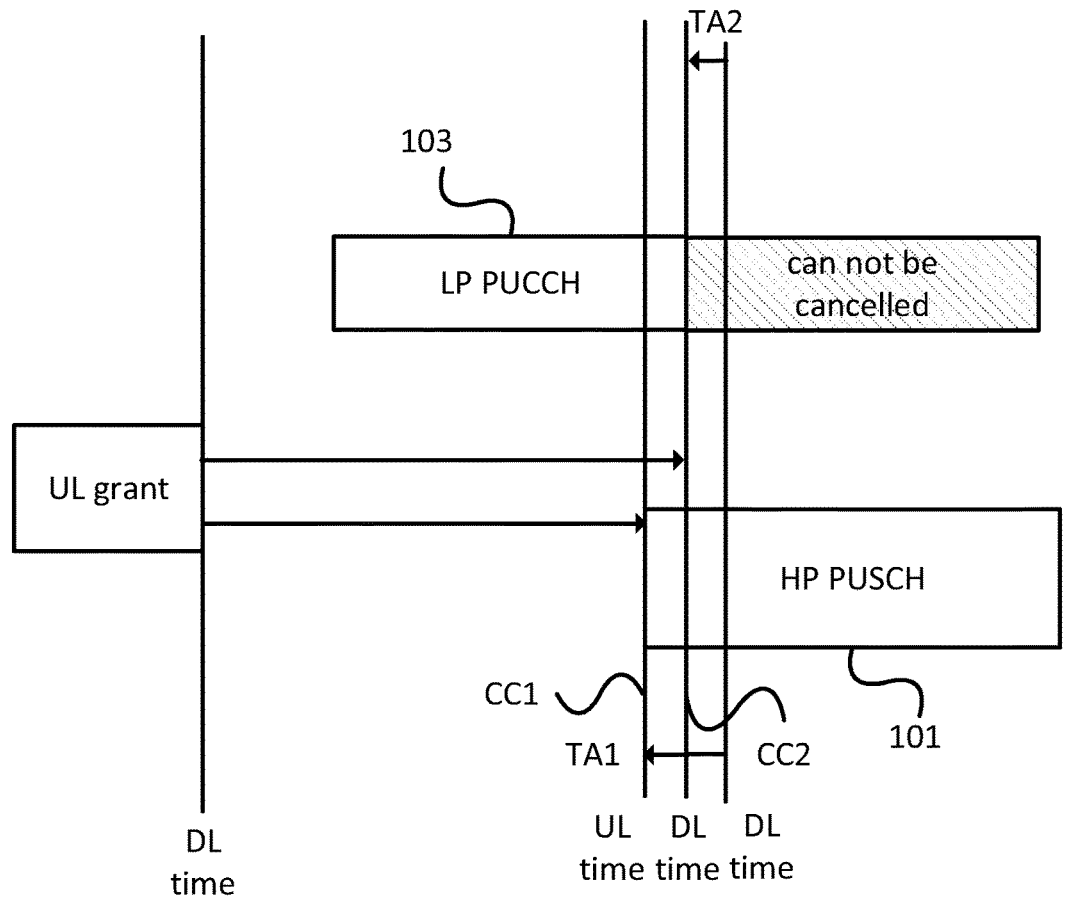
FIG. 1 is a schematic diagram illustrating a high priority (HP) channel and an overlapping low priority (LP) channel on different UL component carriers (CCs) according to an example implementation of the present disclosure.

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art. Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof. A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s). The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more B Ss.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

A BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5 GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage. Each cell (often referred to as a serving cell) may provide services to serve one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells. In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising of the SpCell and optionally one or more Secondary Cells (SCells). An SCG may refer to a group of serving cells associated with the Secondary Node (SN), comprising of the SpCell and optionally one or more SCells.

As discussed above, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used. Additionally, two coding schemes are considered for NR, specifically Low-Density Parity-Check (LDPC) code and Polar Code. The coding scheme adaption may be configured based on channel conditions and/or service applications.

Moreover, it is also considered that in a transmission time interval TX of a single NR frame, downlink (DL) transmission data, a guard period, and uplink (UL) transmission data should at least be included, where the respective portions of the DL transmission data, the guard period, and the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that these relationships may exist. For example, A and/or B may indicate that: A exists alone, A and B exist at the same time, or B exists alone. In addition, the character "/" herein generally represents that the former and latter associated objects are in an "or" relationship.

Examples of some selected terms are provided as follows.

Bandwidth Part (BWP): A subset of the total cell bandwidth of a cell is referred to as a Bandwidth Part (BWP) and beamwidth part adaptation is achieved by configuring the UE with BWP(s) and telling the UE which of the configured BWPs is currently the active one. To enable Bandwidth Adaptation (BA) on the PCell, the gNB configures the UE with UL and DL BWP(s). To enable BA on SCells in case of carrier aggregation (CA), the gNB configures the UE with DL BWP(s) at least (i.e., there may be none in the UL). For the PCell, the initial BWP is the BWP used for initial access. For the SCell(s), the initial BWP is the BWP configured for the UE to first operate at SCell activation. A UE may be configured with a first active uplink BWP by a firstActiveUplinkBWP IE. If the first active uplink BWP is configured for an SpCell, the firstActiveUplinkBWP information element (IE) field contains the ID of the UL BWP to be activated upon performing the radio resource control (RRC) (re-)configuration. If the field is absent, the RRC (re-)configuration does not impose a BWP switch. If the first active uplink BWP is configured for an SCell, the firstActiveUplinkBWP IE field contains the ID of the uplink bandwidth part to be used upon medium access control (MAC)-activation of an SCell.

$T_{proc,2}$: $T_{proc,2}$ is the physical uplink shared channel (PUSCH) preparation procedure time as specified in the 3GPP Technical Specification (TS) 38.214. $T_{proc,2}$ may be given by a formula: $\max((N_2+d_{2,1})(2048+144) \kappa 2^{-\mu} \cdot T_C, d_{2,2})$. That is, $T_{proc,2}=\max((N_2+d_{2,1})(2048+144)\kappa 2^{-\mu} \cdot T_C, d_{2,2})$, where $N_2$ is based on $\mu$ of Table 6.4-1 and Table 6.4-2 for UE processing capability 1 and 2 respectively as specified in the 3GPP TS 38.214; $\mu$ corresponds to the one of $(\mu_{DL}, \mu_{UL})$ resulting with the largest $T_{proc,2}$; $\mu_{DL}$ corresponds to the subcarrier spacing of the downlink with which the PDCCH carrying the DCI scheduling the PUSCH was transmitted; $\mu_{UL}$ corresponds to the subcarrier spacing of the uplink channel with which the PUSCH is to be transmitted, and $\kappa$ is defined as specified in the 3GPP TS 38.211.

If the first symbol of the PUSCH allocation consists of demodulation reference signal (DM-RS) only, then $d_{2,1}=0$, otherwise $d_{2,1}=1$. If the UE is configured with multiple active component carriers, the first uplink symbol in the PUSCH allocation further includes the effect of timing difference between component carriers as specified in the 3GPP TS 38.133. If the scheduling DCI triggered a switch of BWP, $d_{2,2}$ equals to the switching time as specified in the 3GPP TS 38.133, otherwise $d_{2,2}=0$.

Uplink Control Information (UCI) multiplexing timeline: If a UE would transmit multiple overlapping physical uplink control channels (PUCCHs) in a slot or overlapping PUCCH(s) and PUSCH(s) in a slot and, when applicable as described in Subclauses 9.2.5.1 and 9.2.5.2 in the 3GPP TS 38.213, the UE is configured to multiplex different UCI types in one PUCCH, and at least one of the multiple overlapping PUCCHs or PUSCHs is in response to a DCI format detection by the UE, the UE multiplexes all corresponding UCI types if the following conditions are met. If one of the PUCCH transmissions or PUSCH transmissions is in response to a DCI format detection by the UE, the first symbol $S_0$ of the earliest PUCCH or PUSCH, among a group overlapping PUCCHs and PUSCHs in the slot, satisfies the following timeline conditions (1) and (2):

Condition (1): $S_0$ is not before a symbol with CP starting after $T_{proc,1}^{mux}$ after a last symbol of any corresponding physical downlink shared channel (PDSCH), $T_{proc,1}^{mux}$ is given by maximum of $\{T_{proc,1}^{mux,1}, \ldots, T_{proc,1}^{mux,i}\}$ where for the i-th PDSCH with corresponding hybrid automatic repeat request-acknowledgement (HARQ-ACK) transmission on a PUCCH which is in the group of overlapping PUCCHs and PUSCHs, $T_{proc,1}^{mux,i}=(N_1+d_{1,1}+1)\cdot(2048+144)\cdot\kappa\cdot 2^{-\mu}\cdot T_C$, $d_{1,1}$ is selected for the i-th PDSCH as specified in the 3GPP TS 38.214, $N_1$ is selected based on the UE PDSCH processing capability of the i-th PDSCH and subcarrier spacing (SCS) configuration where μ corresponds to the smallest SCS configuration among the SCS configurations used for the PDCCH scheduling the i-th PDSCH (if any), the i-th PDSCH, the PUCCH with corresponding HARQ-ACK transmission for i-th PDSCH, and all PUSCHs in the group of overlapping PUCCHs and PUSCHs.

Condition (2): $S_0$ is not before a symbol with CP starting after $T_{proc,release}^{mux}$ after a last symbol of any corresponding semi persistent scheduling (SPS) PDSCH release. $T_{proc,release}^{mux}$ is given by maximum of $\{T_{proc,release}^{mux,1}, \ldots, T_{proc,release}^{mux,i}\}$ where for the i-th PDCCH providing the SPS PDSCH release with corresponding HARQ-ACK transmission on a PUCCH which is in the group of overlapping PUCCHs and PUSCHs, $T_{proc,release}^{mux,i}=(N+1)(2048+144)\cdot\kappa\cdot 2^{-\mu}\cdot T_C$, N is described in Subclause 10.2 in the 3GPP TS 38.213 and is selected based on the UE PDSCH processing capability of the i-th SPS PDSCH release and SCS configuration μ, where μ corresponds to the smallest SCS configuration among the SCS configurations used for the PDCCH providing the i-th SPS PDSCH release, the PUCCH with corresponding HARQ-ACK transmission for i-th SPS PDSCH release, and all PUSCHs in the group of overlapping PUCCHs and PUSCHs.

If there is no aperiodic channel status information (CSI) report multiplexed in a PUSCH in the group of overlapping PUCCHs and PUSCHs, $S_0$ is not before a symbol with CP starting after $T_{proc,2}^{mux}$ after a last symbol of:

any PDCCH with the DCI format scheduling an overlapping PUSCH, and any PDCCH scheduling a PDSCH or SPS PDSCH release with corresponding HARQ-ACK information in an overlapping PUCCH in the slot.

If there is at least one PUSCH in the group of overlapping PUCCHs and PUSCHs, $T_{proc,2}^{mux}$ is given by maximum of $\{T_{proc,2}^{mux,1}, \ldots, T_{proc,2}^{mux,i}\}$ where for the i-th PUSCH which is in the group of overlapping PUCCHs and PUSCHs, $T_{proc,2}^{mux,i}=\max((N_2+d_{2,1}+1)\cdot(2048+144)\cdot\kappa\cdot 2^{-\mu}\cdot T_C,\ d_{2,2})$. $d_{2,1}$ and $d_{2,2}$ are selected for the i-th PUSCH following the 3GPP TS 38.214. $N_2$ is selected based on the UE PUSCH processing capability of the i-th PUSCH and SCS configuration μ, where μ corresponds to the smallest SCS configuration among the SCS configurations used for the PDCCH scheduling the i-th PUSCH (if any), the PDCCHs scheduling the PDSCHs with corresponding HARQ-ACK transmission on a PUCCH which is in the group of overlapping PUCCHs/PUSCHs, and all PUSCHs in the group of overlapping PUCCHs and PUSCHs.

If there is no PUSCH in the group of overlapping PUCCHs and PUSCHs, $T_{proc,2}^{mux}$ is given by maximum of $\{T_{proc,2}^{mux,1}, \ldots, T_{proc,2}^{mux,i}\}$ where for the i-th PDSCH with corresponding HARQ-ACK transmission on a PUCCH which is in the group of overlapping PUCCHs, $T_{proc,2}^{mux,i}=(N_2+1)\cdot(2048+144)\cdot\kappa\cdot 2^{-\mu}\cdot T_C$, $N_2$ is selected based on the UE PUSCH processing capability of the PUCCH serving cell if configured. $N_2$ is selected based on the UE PUSCH processing capability 1, if PUSCH processing capability is not configured for the PUCCH serving cell. μ is selected based on the smallest SCS configuration between the SCS configuration used for the PDCCH scheduling the i-th PDSCH (if any) with corresponding HARQ-ACK transmission on a PUCCH which is in the group of overlapping PUCCHs and PUSCHs, and the SCS configuration for the PUCCH serving cell.

If there is an aperiodic CSI report multiplexed in a PUSCH in the group of overlapping PUCCHs and PUSCHs, $S_0$ is not before a symbol with CP starting after $T_{proc,CSI}^{mux}=\max((Z+d)\cdot(2048+144)\cdot\kappa\cdot 2^{-\mu}\cdot T_C,\ d_{2,2})$ after a last symbol of:

any PDCCH with the DCI format scheduling an overlapping PUSCH, and any PDCCH scheduling a PDSCH or SPS PDSCH release with corresponding HARQ-ACK information in an overlapping PUCCH in the slot.

Where μ corresponds to the smallest SCS configuration among the SCS configurations of the PDCCHs, the smallest SCS configuration for the group of the overlapping PUSCHs, and the smallest SCS configuration of CSI-reference signal (CSI-RS) associated with the DCI format scheduling the PUSCH with the multiplexed aperiodic CSI report, and d=2 for μ=0, 1, d=3 for μ=2 and d=4 for μ=3. $N_1$, $N_2$, $d_{1,1}$, $d_{2,1}$, $d_{2,2}$, and Z are as specified in the 3GPP TS 38.214, and κ and $T_c$ are defined as specified in the 3GPP TS 38.211.

A time duration may be an absolute time duration. That is, the term "time duration" and the term "absolute time duration" are exchangeable in the present disclosure.

In the following, several conditions of high priority (HP) channels and low priority (LP) channels are overlapped in time are described.

Condition 1: An HP PUSCH may overlap with an HP PUCCH, and both the HP PUSCH and HP PUCCH may overlap with an LP PUCCH. Condition 1 may further include Condition 1-1 to Condition 1-4.

Condition 1-1: The DCI for scheduling the HP PUSCH may end later than the DCI for scheduling the HP PUCCH, and the HP PUSCH may start later than the HP PUCCH.

Condition 1-2: The DCI for scheduling the HP PUSCH may end later than the DCI for scheduling the HP PUCCH, and the HP PUSCH may start earlier than the HP PUCCH.

Condition 1-3: The DCI for scheduling the HP PUSCH may end at the same time as the DCI for scheduling the HP PUCCH, and the HP PUSCH may start later than the HP PUCCH.

Condition 1-4: The DCI for scheduling the HP PUSCH may end at the same time as the DCI for scheduling the HP PUCCH, and the HP PUSCH may start earlier than the HP PUCCH.

Condition 2: An HP PUSCH may overlap with an HP PUCCH, and only the HP PUCCH may overlap with an LP PUCCH or an LP PUSCH. Condition 2 may further include Condition 2-1 and Condition 2-2.

Condition 2-1: The DCI for scheduling the HP PUSCH may end later than the DCI for scheduling the HP PUCCH, and the HP PUSCH may start later than the HP PUCCH.

Condition 2-2: The DCI for scheduling the HP PUSCH may end at the same time as the DCI for scheduling the HP PUCCH, and the HP PUSCH may start later than the HP PUCCH.

Condition 3: Both a first HP PUSCH and a second HP PUSCH may overlap with an LP PUCCH. Condition 3 may further include Condition 3-1 to Condition 3-4.

Condition 3-1: The DCI for scheduling the second HP PUSCH may end later than the DCI for scheduling the first HP PUSCH, and the second HP PUSCH may start later than the first HP PUSCH.

Condition 3-2: The DCI for scheduling the second HP PUSCH may end later than the DCI for scheduling the first HP PUSCH, and the second HP PUSCH may start earlier than the first HP PUSCH.

Condition 3-3: The DCI for scheduling the second HP PUSCH may end at the same time as the DCI for scheduling the first HP PUSCH, and the second HP PUSCH may start later than the first HP PUSCH.

Condition 3-4: The DCI for scheduling the second HP PUSCH may end at the same time as the DCI for scheduling the first HP PUSCH, and the second HP PUSCH may start earlier than the first HP PUSCH.

I. Cancellation Timeline for Cancelling Transmissions of LP Channels

It is possible that overlapping HP channels may be scheduled to overlap with other LP channels, and some of the overlapping HP channels may be multiplexed in one HP channel. In this circumstance, the definition of the cancellation timeline for cancelling transmission of LP channels should be clarified.

Further, the cancellation timeline may not take into account a timing difference between component carriers if an HP channel and an overlapping LP channel are on different UL CCs. FIG. 1 is a schematic diagram illustrating an HP channel (e.g., HP PUSCH) 101 and an overlapping LP channel (e.g., LP PUCCH) 103 on different UL CCs (e.g., CC1 and CC2) according to an example implementation of the present disclosure. If a timing difference (e.g., TA1 and TA2) of two UL CCs (e.g., CC1 and CC2) is not considered, the UE may not be able to cancel the LP channel 103 on CC2 at the time when the transmission of HP channel 101 on CC1 starts, as shown in FIG. 1.

Figure 2:
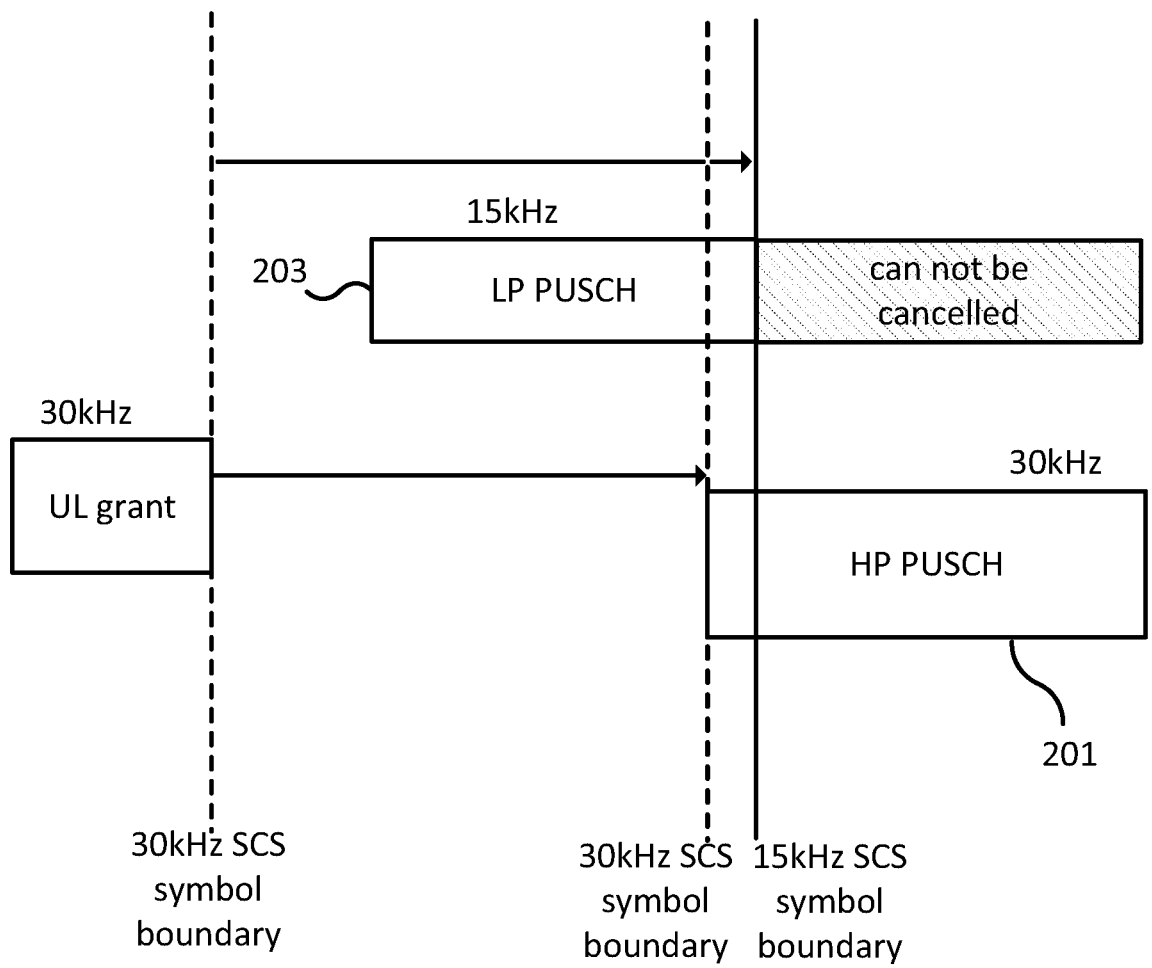
FIG. 2 is a schematic diagram illustrating a starting symbol of an HP channel has an ending boundary aligned with a symbol of an overlapping LP channel with smaller SCS according to an example implementation of the present disclosure.

The difference between SCS of the HP channel and the LP channel may result in an LP channel that cannot be cancelled by the UE even if some HP channels overlap with the LP channel and the cancellation timeline is satisfied. FIG. 2 is a schematic diagram illustrating a starting symbol of an HP channel (e.g., HP PUSCH) 201 has an ending boundary aligned with a symbol of an overlapping LP channel (e.g., LP PUCCH) 203 with smaller SCS according to an example implementation of the present disclosure. If the starting symbol of the HP channel 201 has an ending boundary aligned with a symbol of an overlapping LP channel 203 with smaller SCS (e.g., 15 kHZ), then it is possible that the UE may not be able to cancel the LP channel 203 at the time when transmission of HP channel 201 starts, as shown in FIG. 2.

In the circumstances as described in FIG. 1 and FIG. 2, the cancellation timeline for scheduling an HP channel that cancels transmission of LP channels should be extended by d1 symbols. The definition of d1 for extending the cancellation timeline for scheduling an HP channel that cancels transmission of LP channels should be clarified. That is, the SCS of d1 for extending the cancellation timeline should be clarified.

The cancellation timeline may be determined based on the earliest DCI for scheduling an HP channel that overlaps with an LP channel. Specifically, any HP channel which overlaps with the LP channel may have a starting symbol after a time duration $T_{proc,2}$+d1 after the end of the earliest DCI for scheduling an HP channel that overlaps with an LP channel.

For example, in Condition 1-1 and Condition 1-3, the HP PUCCH which overlaps with the LP PUCCH may have a starting symbol after a time duration $T_{proc,2}$+d1 after the end of the DCI for scheduling the HP PUCCH that overlaps with the LP PUCCH. In Condition 1-2 and Condition 1-4, the HP PUSCH which overlaps with the LP PUCCH may have a starting symbol after a time duration $T_{proc,2}$+d1 after the end of the DCI for scheduling the HP PUCCH that overlaps with the LP PUCCH. In Condition 3-1 and Condition 3-3, the first HP PUSCH which overlaps with the LP PUCCH may have a starting symbol after a time duration $T_{proc,2}$+d1 after the end of the DCI scheduling the first HP PUSCH that overlaps with the LP PUCCH. In Condition 3-2 and Condition 3-4, the second HP PUSCH which overlaps with the LP PUCCH may have a starting symbol after a time duration $T_{proc,2}$+d1 after the end of the DCI for scheduling the first HP PUSCH that overlaps with the LP PUCCH.

In some implementations, the cancellation timeline may be determined based on the latest DCI that schedules an HP channel overlapping with the LP channel and ends latest. Specifically, any HP channel which overlaps with the LP channel may have a starting symbol after a time duration $T_{proc,2}$+d1 after the end of the latest DCI for scheduling an HP channel that overlaps with an LP channel.

For example, in Condition 1-1 and Condition 1-3, the HP PUCCH which overlaps with the LP PUCCH may have a starting symbol after a time duration $T_{proc,2}$+d1 after the end of the DCI for scheduling the HP PUSCH that overlaps with the LP PUCCH. In Condition 1-2 and Condition 1-4, the HP PUSCH which overlaps with the LP PUCCH may have a starting symbol after a time duration $T_{proc,2}$+d1 after the end of the DCI for scheduling the HP PUSCH that overlaps with the LP PUCCH. In Condition 3-1 and Condition 3-3, the first HP PUSCH which overlaps with the LP PUCCH may have a starting symbol after a time duration $T_{proc,2}$+d1 after the end of the DCI for scheduling the second HP PUSCH that overlaps with the LP PUCCH. In Condition 3-2 and Condition 3-4, the second HP PUSCH which overlaps with the LP PUCCH may have a starting symbol after a time duration $T_{proc,2}$+d1 after the end of the DCI for scheduling the second HP PUSCH that overlaps with the LP PUCCH.

In some implementations, the cancellation timeline may be determined based on the earliest DCI for scheduling an HP channel that overlaps with an LP channel. Specifically, the HP channel which overlaps with the LP channel that is actually transmitted may have a starting symbol after a time duration $T_{proc,2}$+d1 after the end of the earliest DCI for scheduling an HP channel that overlaps with an LP channel. For example, in Condition 1-1, Condition 1-2, Condition 1-3 and Condition 1-4, the HP PUSCH which overlaps with the LP PUCCH may have a starting symbol after a time duration $T_{proc,2}$+d1 after the end of the DCI for scheduling the HP PUCCH that overlaps with the LP PUCCH. In Condition 3-1, Condition 3-2, Condition 3-3 and Condition 3-4, the first HP PUSCH which overlaps with the LP PUCCH and the second HP PUSCH which overlaps with the LP PUCCH may have a starting symbol after a time duration $T_{proc,2}$+d1 after the end of the DCI for scheduling the first HP PUSCH that overlaps with the LP PUCCH.

In some implementations, the cancellation timeline may be determined based on the latest DCI for scheduling an HP channel that overlaps with an LP channel. Specifically, the HP channel which overlaps with the LP channel that is actually transmitted may have a starting symbol after a time duration $T_{proc,2}$+d1 after the end of the latest DCI for scheduling an HP channel that overlaps with an LP channel. For example, in Condition 1-1, Condition 1-2, Condition 1-3 and Condition 1-4, the HP PUSCH which overlaps with the LP PUCCH may have a starting symbol after a time duration $T_{proc,2}+d1$ after the end of the DCI for scheduling the HP PUSCH that overlaps with the LP PUCCH. In Condition 3-1, Condition 3-2, Condition 3-3 and Condition 3-4, the first HP PUSCH which overlaps with the LP PUCCH and the second HP PUSCH which overlaps with the LP PUCCH may have a starting symbol after a time duration $T_{proc,2}+d1$ after the end of the DCI for scheduling the second HP PUSCH that overlaps with the LP PUCCH.

In some implementations, the cancellation timeline may be determined based on the earliest DCI scheduling an HP channel that overlaps with an LP channel. Specifically, the HP channel in the group of overlapping HP channels and LP channels that is actually transmitted may have a starting symbol after a time duration $T_{proc,2}+d1$ after the end of the earliest DCI scheduling an HP channel that overlaps with an LP channel. For example, in Condition 1-1, Condition 1-2, Condition 1-3, Condition 1-4, Condition 2-1 and Condition 2-2, the HP PUSCH may have a starting symbol after a time duration $T_{proc,2}+d1$ after the end of the DCI for scheduling the HP PUCCH that overlaps with the LP PUCCH. In Condition 3-1, Condition 3-2, Condition 3-3 and Condition 3-4, he first HP PUSCH which overlaps with the LP PUCCH and the second HP PUSCH which overlaps with the LP PUCCH may have a starting symbol after a time duration $T_{proc,2}+d1$ after the end of the DCI for scheduling the first HP PUSCH that overlaps with the LP PUCCH.

In some implementations, the cancellation timeline may be determined based on the latest DCI scheduling an HP channel in the group of overlapping HP channels and LP channels. Specifically, the HP channel that is actually transmitted may have a starting symbol after a time duration $T_{proc,2}+d1$ after the end of the latest DCI for scheduling an HP channel in the group of overlapping HP channels and LP channels. For example, in Condition 1-1, Condition 1-2, Condition 1-3, Condition 1-4, Condition 2-1 and Condition 2-2, the HP PUSCH may have a starting symbol after a time duration $T_{proc,2}+d1$ after the end of the DCI for scheduling the HP PUSCH. In Condition 3-1, Condition 3-2, Condition 3-3 and Condition 3-4, the first HP PUSCH which overlaps with the LP PUCCH and the second HP PUSCH which overlaps with the LP PUCCH may have a starting symbol after a time duration $T_{proc,2}+d1$ after the end of the DCI for scheduling the second HP PUSCH that overlaps with the LP PUCCH.

In some implementations, the cancellation timeline may be determined based on respective DCI scheduling of an HP channel in the group of overlapping HP channels and LP channels. That is, an HP channel in the group of overlapping HP channels and LP channels may have a starting symbol after a time duration $T_{proc,2}+d1$ after the end of the corresponding DCI for scheduling the HP channel.

The earliest DCI may be a DCI with earliest ending symbol and the latest DCI may be a DCI with latest ending symbol. The earliest DCI may be a DCI with earliest starting symbol and the latest DCI may be a DCI with latest starting symbol.

In the following, the determinations of the SCS used for calculation of $T_{proc,2}$ are described.

The SCS may be determined as the smallest configuration SCS among the SCS configurations of the PDCCHs providing the DCIs for the low priority channel(s) (if any), the SCS configuration for the PDCCH providing the earliest DCI for the high priority channels, the SCS configuration of the low priority channels to be cancelled and the SCS configuration of the high priority channel corresponding to the earliest DCI. When two or more DCIs scheduling overlapping HP channels have the same earliest ending symbols, all the DCIs and corresponding HP channels may be taken into account for determination of the SCS for $T_{proc,2}$.

In some implementations, the SCS may be determined as the smallest SCS configuration among the SCS configurations of the PDCCHs providing the DCIs for the low priority channel(s) (if any), the SCS configuration for the PDCCH providing the overlapping high priority channels, the SCS configuration of the low priority channels to be cancelled and the SCS configuration of the overlapping high priority channels.

In some implementations, the SCS may be determined as the smallest SCS configuration among the SCS configurations of the PDCCHs providing the DCIs for the low priority channel(s) (if any), the SCS configuration for the PDCCH providing the high priority channels overlapping with the low priority channel(s) to be cancelled, the SCS configuration of the low priority channels to be cancelled and the SCS configuration of the high priority channels overlapping with the low priority channel(s) to be cancelled.

The cancellation time for multiple overlapping HP channels is described. A scheduling restriction for a UE may be provided, such that the UE may not be scheduled with a second HP channel which overlaps with a first HP channel, if the first HP channel overlaps with LP channel(s). In some implementations, a scheduling restriction for a UE may be provided, such that the UE may not be scheduled with a second HP channel which overlaps with a first HP channel or a second HP channel which starts earlier than the first HP channel, if the first HP channel overlaps with LP channel(s) and is scheduled with DCI ending earlier than the DCI for scheduling the second HP channel. In some implementations, the UE may not be scheduled with more than one overlapping HP channel with different SCS configurations.

The cancellation timeline may take into account the timing difference between component carriers of the HP PUSCH and LP PUCCH, or the timing difference between component carriers of the HP PUCCH and LP PUSCH.

In some implementations, the first overlapping symbol of the high priority channel may not earlier than a time duration $T_{proc,2}+d1$ after the last symbol of the PDCCH with the DCI format for scheduling the high priority channel, and the start of the CP of the first symbol of the high priority channel may not start before the start of the CP of the first symbol (which is after a time duration $T_{proc,2}+d1$ after the last symbol of the PDCCH with the DCI format for scheduling the high priority channel) of the low priority channel that would be transmitted if the high priority channel was absent, including the effect of timing advance.

In some implementations, the first symbol $S_0$ of the high priority channel may not before a symbol with CP starting after a time point t1, where the time point t1 may be the starting time of the CP of symbol Si which is the first uplink symbol of the low priority channel with its CP starting after a time duration $T_{proc,2}+d1$ after the end of the last symbol of the PDCCH with the DCI format for scheduling the high priority channel, including the effect of timing advance.

In some implementations, the first overlapping symbol of the high priority channel may not earlier than a time duration $T_{proc,2}+d1+d1'$ after the last symbol of the PDCCH with the DCI format for scheduling the high priority channel, where d1 may be the number of symbols reported by a UE, and d1' may be the number of symbols configured by the network. Configuration of d1' may be based on the timing difference of the carriers on which the overlapping HP channel and LP channel are transmitted Timing difference may consider the effect of timing advance and reception timing of the corresponding DL reference cell. The SCS of d1' may be based on the smallest value provided in scs-SpecificCarrierList of FrequencyInfoUL or FrequencyInfoUL-SIB of the configured component carriers. For calculation the time duration $T_{proc,2}+d1+d1'$, $d1'$ may be scaled as $$d1' \cdot \frac{2^{-\mu_{UL}}}{2^{-\mu}},$$

where $\mu$ may be the smallest SCS configuration of the PDCCHs providing the DCIs for the LP channel(s) (if any), the SCS configuration for the PDCCH providing the DCI for the HP channel, and $\mu_{UL}$ may be the value of the smallest SCS configuration provided in scs-SpecificCarrierList of FrequencyInfoUL or FrequencyInfoUL-SIB of the configured component carriers.

The UE may cancel the overlapping low priority channel by the first overlapping symbol at the latest. Further, the first overlapping symbol of the high priority channel may not earlier than a time duration $T_{proc,2}+d1$ after the last symbol of the PDCCH with the DCI format for scheduling the high priority channel, and the first overlapping symbol of an HP channel and LP channel may have an aligned starting boundary.

In some implementations, the UE may cancel the overlapping low priority channel (with SCS configuration $\mu_L$) by the first overlapping symbol at the latest. Further, the first overlapping symbol of the high priority channel (with SCS configuration $\mu_H$) may not be earlier than a time duration $T_{proc,2}+d1$ after the last symbol of the PDCCH with the DCI format for scheduling the high priority channel, and the first symbol of HP channel may be with symbol number n satisfying n mod d=0, where $d=2^{\mu_H-\mu_L}$, when $\mu_H \geq \mu_L$.

In some implementations, the UE may cancel the overlapping low priority channel by the first overlapping symbol at the latest. Further, the first overlapping symbol of the high priority channel may not earlier than a time duration $T_{proc,2}+d1+d1'$ after the last symbol of the PDCCH with the DCI format for scheduling the high priority channel, where d1 may be the number of symbols reported by the UE, and d1' may be the number of symbols configured by the network. The SCS of d1' may be based on the smallest value provided in scs-SpecificCarrierList of FrequencyInfoUL or FrequencyInfoUL-SIB of the configured component carriers. In some implementations, the SCS of d1' may be based on the largest value provided in scs-SpecificCarrierList of FrequencyInfoUL or FrequencyInfoUL-SIB of the configured component carriers.

The SCS of d1 may be determined as the smallest SCS configuration among the SCS configurations of the PDCCHs providing the DCIs for the LP channel(s) (if any), the SCS configuration for the PDCCH providing the DCI for the HP channel(s), the SCS configuration of the LP channels to be cancelled and the SCS configuration of the HP channel(s).

The value of d1 may be reported by the UE assuming an SCS of 15 kHz for frequency range 1 (FR1) and SCS of 60 kHz for frequency range 2 (FR2). The value of d1 may be scaled as $d1 \cdot 2^\mu$ for calculation of the cancellation timeline, where $\mu$ may be the smallest SCS configuration among the SCS configurations of the PDCCHs providing the DCIs for the LP channel(s) (if any), the SCS configuration of the PDCCH providing the DCI for the HP channel, the SCS configuration of the LP channels to be cancelled and the SCS configuration of the HP channel.

In some implementations, the value of d1 may be reported by the UE assuming the SCS of 30 kHz for FR1 and the SCS of 120 kHz for FR2. The value of d1 may be scaled as $$d1 \cdot \frac{2^\mu}{2}$$

for calculation of the cancellation timeline, where $\mu$ may be the smallest SCS configuration among the SCS configurations of the PDCCHs providing the DCIs for the LP channel(s) (if any), the SCS configuration of the PDCCH providing the DCI for the HP channel, the SCS configuration of the LP channels to be cancelled and the SCS configuration of the HP channel.

In some implementations, the value of d1 may be reported by the UE assuming the value of the SCS as the smallest value among the SCSs provided in scs-SpecificCarrierList of FrequencyInfoUL or FrequencyInfoUL-SIB of the configured component carriers. For calculation of the cancellation timeline, the value of d1 may be scaled as $$d1 \cdot \frac{2^{-\mu_{UL}}}{2^{-\mu}},$$

where $\mu$ may be the smallest SCS configuration among the SCS configurations of the PDCCHs providing the DCIs for the LP channel(s) (if any), the SCS configuration of the PDCCH providing the DCI for the HP channel, and $\mu_{UL}$ may be the value of the smallest SCS configuration provided in scs-SpecificCarrierList of FrequencyInfoUL or FrequencyInfoUL-SIB of the configured component carriers.

In some implementations, the value of d1 may be reported by the UE assuming the value of the SCS as the smallest value provided in scs-SpecificCarrierList of FrequencyInfoUL or FrequencyInfoUL-SIB, and scs-SpecificCarrierList of FrequencyInfoDL or FrequencyInfoDL-SIB of the configured component carriers. For calculation of the cancellation timeline, the value of d1 may be scaled as $$d1 \cdot \frac{2^{-\mu_0}}{2^{-\mu}},$$

where $\mu$ may be the smallest SCS configuration among the SCS configurations of the PDCCHs providing the DCIs for the LP channel(s) (if any), the SCS configuration of the PDCCH providing the DCI for the HP channel, and $\mu_0$ may be the value of the smallest SCS configuration provided in scs-SpecificCarrierList of FrequencyInfoUL or FrequencyInfoUL-SIB, and scs-SpecificCarrierList of FrequencyInfoDL or FrequencyInfoDL-SIB of the configured component carriers.

The d1 values may be reported per SCS, and the SCS of d1 for calculation of the cancellation timeline may be determined. In the following, the determinations of the SCS of d1 for calculation of the cancellation timeline are described.

The SCS of d1 may be determined as the smallest SCS configuration among the SCS configurations of the PDCCHs providing the DCIs for the LP channel(s) (if any), the SCS configuration of the PDCCH providing the DCI for the HP channel, the SCS configuration of the LP channels to be cancelled and the SCS configuration of the HP channel.

In some implementations, the SCS of d1 may be determined as the smallest SCS configuration among the SCS configurations of the PDCCHs providing the DCIs for the low priority channel(s) (if any), the SCS configuration of the PDCCH providing the earliest DCI for the high priority channels, the SCS configuration of the low priority channels to be cancelled and the SCS configuration of the high priority channel corresponding to the earliest DCI. When two or more DCIs scheduling overlapping HP channels have the same earliest ending symbols, all the DCIs and corresponding HP channels may be taken into account for determination of the SCS of d1.

In some implementations, the SCS of d1 may be determined as the smallest SCS configuration among the SCS configurations of the PDCCHs providing the DCIs for the low priority channel(s) (if any), the SCS configuration of the PDCCH providing the overlapping high priority channels, the SCS configuration of the low priority channels to be cancelled and the SCS configuration of the overlapping high priority channels.

In some implementations, the SCS of d1 may be determined as the smallest SCS configuration among the SCS configurations of the PDCCHs providing the DCIs for the low priority channel(s) (if any), the SCS configuration of the PDCCH providing the high priority channels overlapping with the low priority channel(s) to be cancelled, the SCS configuration of the low priority channels to be cancelled and the SCS configuration of the high priority channels overlapping with the low priority channel(s) to be cancelled.

The SCS of d1 may be determined as the smallest value of subcarrierSpacing for the active DL BWPs and active UL BWPs of the configured component carriers. The SCS of d1 may be determined as the smallest value provided in scs-SpecificCarrierList of FrequencyInfoUL or FrequencyInfoUL-SIB of the configured component carriers. The SCS of d1 may be determined as the smallest value provided in scs-SpecificCarrierList of FrequencyInfoUL or FrequencyInfoUL-SIB, and scs-SpecificCarrierList of FrequencyInfoDL or FrequencyInfoDL-SIB of the configured component carriers.

The SCS of d1 may be determined as the smallest SCS configuration among the SCS configurations of the PDCCHs providing the DCIs for the low priority channel(s) (if any), and the SCS configuration of the low priority channels in a group of overlapping low priority channels and high priority channels. The SCS of d1 may be determined as the smallest SCS configuration among the SCS configurations of the PDCCHs providing the DCIs for the high priority channel(s) and the SCS configuration of the high priority channels in a group of overlapping low priority channels and high priority channels.

The time duration $T_{proc,2}+d1$ may be given by a formula: $(N_2+d1)(2048+144) \cdot \kappa 2^{-\mu} \cdot T_C$. That is, $T_{proc,2}+d1=(N_2+d1)(2048+144) \cdot \kappa 2^{-\mu} \cdot T_C$, where $N_2$ is based on $\mu$ of Table 6.4-1 and Table 6.4-2 for UE processing capability 1 and 2 respectively as specified in the 3GPP TS 38.214, and $\kappa$ is defined as specified in the 3GPP TS 38.211.

II. Processing Timeline Extension for HP Channels

More than one HP channel overlapping with each other may be scheduled to overlap with other LP channels. In this circumstance, the condition for extending the processing timeline for an HP channel should be clarified. In addition, the definition of d2 for extending the processing timeline should be clarified. That is, the SCS of d2 for extending processing timeline should be clarified.

The minimum processing time of an HP channel which overlaps with LP channel(s) or HP channel(s) in a group of overlapping HP channels and LP channels may be extended by d2 symbols. For example, the PDSCH processing procedure time for the HP PUCCH and the PUSCH preparation procedure time for the HP PUSCH in Condition 1 and Condition 2, and the PUSCH preparation procedure time for the HP PUSCH in Condition 3 may be extended by d2 symbols.

The minimum processing time of an HP channel which overlaps with LP channel(s) to be cancelled may be extended by d2 symbols. For example, the PDSCH processing procedure time for the HP PUCCH and the PUSCH preparation procedure time for the HP PUSCH in Condition 1, the PDSCH processing procedure time for the HP PUCCH in Condition 2, and the PUSCH preparation procedure time for the HP PUSCH in Condition 3 may be extended by d2 symbols.

In some implementations, when a first HP channel overlaps with an LP channel and the DCI for scheduling the first HP channel ends earlier or at the same time as the DCI for scheduling a second HP channel, the minimum processing time of the second HP channel starting earlier than or at the same time as the first HP channel may be extended by d2 symbols. For example, the PUSCH preparation procedure time for the HP PUSCH in Condition 1-2, Condition 1-4, Condition 3-2 and Condition 3-4 may be extended by d2 symbols.

In some implementations, when a first HP channel overlaps with an LP channel and the DCI for scheduling the first HP channel ends earlier or at the same time as the DCI for scheduling a second HP channel, the minimum processing time of the second HP channel which overlaps with a first HP channel or an LP channel to be cancelled may be extended by d2 symbols if the second HP channel is on the same carrier as the first HP channel or the LP channel.

In some implementations, when a first HP PUCCH overlaps with an LP channel and the DCI for scheduling the first HP PUCCH ends earlier or at the same time as the DCI for scheduling a second HP PUCCH, the minimum processing time of the second HP PUCCH which overlaps with an LP channel cancelled by a first HP PUCCH in a different sub-slot may not be extended by d2 symbols.

The SCS of d2 may be determined as the smallest SCS configuration among the SCS configurations of the PDCCHs providing the DCIs for the LP channel(s) (if any), the SCS configuration of the PDCCH providing the DCI for the HP channel(s), the SCS configuration of the LP channels to be cancelled and the SCS configuration of the HP channel(s).

The value of d2 may be reported by the UE assuming an SCS of 15 kHz for FR1 and SCS of 60 kHz for FR2. The value of d2 may be scaled as $d2 \cdot 2^\mu$ for calculation of the PUSCH preparation procedure time, where $\mu$ may be the smallest SCS configuration between the SCS configuration of the PDCCH providing the DCI for the HP channel and the SCS configuration of the HP channel.

In some implementations, the value of d2 may be reported by the UE assuming an SCS of 30 kHz for FR1 and an SCS of 120 kHz for FR2. The value of d2 may be scaled as $$d2 \cdot \frac{2^\mu}{2}$$

for calculation of the PUSCH preparation procedure time, where $\mu$ may be the smallest SCS configuration of the PDCCHs providing the DCI for the HP channel, and the SCS configuration of the HP channel.

In some implementations, the value of d2 may be reported by the UE assuming an SCS of 15 kHz for FR1 and an SCS of 60 kHz for FR2. The value of d2 may be scaled as $d2 \cdot 2^\mu$ for calculation of the PUSCH preparation procedure time, where $\mu$ may be the smallest SCS configuration among the SCS configurations of the PDCCHs providing the DCIs for the LP channel(s) (if any), the SCS configuration of the PDCCH providing the DCI for the HP channel, the SCS configuration of the LP channels to be cancelled and the SCS configuration of the HP channel.

In some implementations, the value of d2 may be reported by the UE assuming an SCS of 30 kHz for FR1 and an SCS of 120 kHz for FR2. The value of d2 may be scaled as $$d2 \cdot \frac{2^\mu}{2}$$

for calculation of the PUSCH preparation procedure time, where $\mu$ may be the smallest SCS configuration among the SCS configurations of the PDCCHs providing the DCIs for the LP channel(s) (if any), the SCS configuration of the PDCCH providing the DCI for the HP channel, the SCS configuration of the LP channels to be cancelled and the SCS configuration of the HP channel.

In some implementations, the value of d2 may be reported by the UE assuming the value of the SCS as the smallest value provided in scs-SpecificCarrierList of FrequencyInfoUL or FrequencyInfoUL-SIB of the configured component carriers. For calculation of the PUSCH preparation procedure time, the value of d2 may be scaled as $$d2 \cdot \frac{2^{-\mu_{UL}}}{2^{-\mu}},$$

where $\mu$ may be the smallest SCS configuration of the PDCCHs providing the DCI for the HP channel, and $\mu_{UL}$ may be the value of the smallest SCS configuration provided in scs-SpecificCarrierList of FrequencyInfoUL or FrequencyInfoUL-SIB of the configured component carriers.

In some implementations, the value of d2 may be reported by the UE assuming the value of the SCS as the smallest value provided in scs-SpecificCarrierList of FrequencyInfoUL or FrequencyInfoUL-SIB of the configured component carriers. For calculation of the PUSCH preparation procedure time, the value of d2 may be scaled as $$d2 \cdot \frac{2^{-\mu_{UL}}}{2^{-\mu}},$$

where $\mu$ may be the smallest SCS configuration among the SCS configurations of the PDCCHs providing the DCIs for the LP channel(s) (if any), the SCS configuration of the PDCCH providing the DCI for the HP channel, and $\mu_{UL}$ may be the value of the smallest SCS configuration provided in scs-SpecificCarrierList of FrequencyInfoUL or FrequencyInfoUL-SIB of the configured component carriers.

In some implementations, the value of d2 may be reported by the UE assuming the value of the SCS as the smallest value provided in scs-SpecificCarrierList of FrequencyInfoUL or FrequencyInfoUL-SIB, and scs-SpecificCarrierList of FrequencyInfoDL or FrequencyInfoDL-SIB of the configured component carriers. For calculation of the PUSCH preparation procedure time, the value of d2 may be scaled as $$d2 \cdot \frac{2^{-\mu_0}}{2^{-\mu}},$$

where $\mu$ may be the smallest SCS configuration among the SCS configurations of the PDCCHs providing the DCI for the HP channel, and $\mu_0$ may be the value of the smallest SCS configuration provided in scs-SpecificCarrierList of FrequencyInfoUL or FrequencyInfoUL-SIB, and scs-SpecificCarrierList of FrequencyInfoDL or FrequencyInfoDL-SIB of the configured component carriers.

In some implementations, the value of d2 may be reported by the UE assuming the value of the SCS as the smallest value provided in scs-SpecificCarrierList of FrequencyInfoUL or FrequencyInfoUL-SIB, and scs-SpecificCarrierList of FrequencyInfoDL or FrequencyInfoDL-SIB of the configured component carriers. For calculation of the PUSCH preparation procedure time, the value of d2 may be scaled as $$d2 \cdot \frac{2^{-\mu_0}}{2^{-\mu}},$$

where $\mu$ may be the smallest SCS configuration among the SCS configurations of the PDCCHs providing the DCIs for the LP channel(s) (if any), the SCS configuration of the PDCCH providing the DCI for the HP channel, and $\mu_0$ may be the value of the smallest SCS configuration provided in scs-SpecificCarrierList of FrequencyInfoUL or FrequencyInfoUL-SIB, and scs-SpecificCarrierList of FrequencyInfoDL or FrequencyInfoDL-SIB of the configured component carriers.

The d2 values may be reported per SCS, and the SCS of d2 for calculation of the PUSCH preparation procedure time may be determined. In the following, the determinations of the SCS of d2 for calculation of the PUSCH preparation procedure time are described.

In some implementations, for calculation of the PUSCH preparation procedure time for a high priority channel, the SCS of d2 may be determined as the smallest SCS configuration among the SCS configurations of the PDCCHs providing the DCI for the HP channel, and the SCS configuration of the HP channel.

In some implementations, for calculation of the PUSCH preparation procedure time for a high priority channel, the SCS of d2 may be determined as the smallest SCS configuration among the SCS configurations of the PDCCHs providing the DCIs for the LP channel(s) (if any), the SCS configuration of the PDCCH providing the DCI for the HP channel, the SCS configuration of the LP channels to be cancelled and the SCS configuration of the HP channel.

In some implementations, for calculation of the PUSCH preparation procedure time for a high priority channel, the SCS of d2 may be determined as the smallest SCS configuration among the SCS configurations of the PDCCHs providing the DCIs for the low priority channel(s) (if any), the SCS configuration of the PDCCH providing the high priority channel, the SCS configuration of the PDCCH providing the high priority channels which overlap with the high priority channel with DCIs ending before or ending at the same time as the high priority channel, the SCS configuration of the low priority channels to be cancelled and the SCS configuration of the overlapping high priority channels.

In some implementations, for calculation of the PUSCH preparation procedure time for a high priority channel, the SCS of d2 may be determined as the smallest value of subcarrierSpacing for the active DL BWPs and active UL BWPs of the configured component carriers. For calculation of the PUSCH preparation procedure time for a high priority channel, the SCS of d2 may be determined as the smallest value provided in scs-SpecificCarrierList of FrequencyInfoUL or FrequencyInfoUL-SIB of the configured component carriers. For calculation of the PUSCH preparation procedure time for a high priority channel, the SCS of d2 may be determined as the smallest value provided in scs-SpecificCarrierList of FrequencyInfoUL or FrequencyInfoUL-SIB, and scs-SpecificCarrierList of FrequencyInfoDL or FrequencyInfoDL-SIB of the configured component carriers.

The time duration $T_{proc,2}+d2$ may be given by a formula: $\max((N_2+d_{2,1}+d2)(2048+144)\cdot\kappa 2^{-\mu}\cdot T_C, d_{2,2})$. That is, $T_{proc,2}+d2=\max((N_2+d_{2,1}+d2)(2048+144)\cdot\kappa 2^{-\mu}\cdot T_C, d_{2,2})$, where $N_2$ is based on $\mu$ of Table 6.4-1 and Table 6.4-2 for UE processing capability 1 and 2 respectively as specified in the 3GPP TS 38.214, where u is the smallest SCS configuration of the PDCCHs providing the DCI for the HP channel, and the SCS configuration of the HP channel, and $\kappa$ is defined as specified in the 3GPP TS 38.211.

If the first symbol of the PUSCH allocation consists of DM-RS only, then $d_{2,1}=0$, otherwise $d_{2,1}=1$. If the UE is configured with multiple active component carriers, the first uplink symbol in the PUSCH allocation further includes the effect of timing difference between component carriers as specified in the 3GPP TS 38.133. If the scheduling DCI triggered a switch of BWP, $d_{2,2}$ equals to the switching time as specified in the 3GPP TS 38.133, otherwise $d_{2,2}=0$. For a UE that supports capability 2 on a given cell, the processing time according to UE processing capability 2 is applied if the high layer parameter processingType2Enabled in PUSCH-ServingCellConfig is configured for the cell and set to enable.

In some implementations, the time duration of $T_{proc,2}+d2$ may be given by a formula: $\max((N_2+d_{2,1}+d2)(2048+144)\cdot\kappa 2^{-\mu}\cdot T_C, d_{2,2})$. That is, $T_{proc,2}+d2=\max((N_2+d_{2,1}+d2)(2048+144)\cdot\kappa 2^{-\mu}\cdot T_C, d_{2,2})$, where N2 is based on $\mu$ of Table 6.4-1 and Table 6.4-2 for UE processing capability 1 and 2 respectively as specified in the 3GPP TS 38.214, where $\mu$ is the smallest SCS configuration of the PDCCHs providing the DCIs for the LP channel(s) (if any), the SCS configuration for the PDCCH providing the DCI for the HP channel, the SCS configuration of the LP channels to be cancelled and the SCS configuration of the HP channel, and the SCS configuration of the HP channel, and $\kappa$ is defined as specified in the 3GPP TS 38.211.

If the first symbol of the PUSCH allocation consists of DM-RS only, then $d_{2,1}=0$, otherwise $d_{2,1}=1$. If the UE is configured with multiple active component carriers, the first uplink symbol in the PUSCH allocation further includes the effect of a timing difference between component carriers as specified in the 3GPP TS 38.133. If the scheduling DCI triggered a switch of BWP, $d_{2,2}$ equals to the switching time as specified in the 3GPP TS 38.133, otherwise $d_{2,2}=0$. For a UE that supports capability 2 on a given cell, the processing time according to UE processing capability 2 is applied if the high layer parameter processingType2Enabled in PUSCH-ServingCellConfig is configured for the cell and set to enable.

The CSI computation time may be extended by $d_{2,CSI}$ symbols. When the CSI request field on a DCI triggers a CSI report(s) on PUSCH, the UE may provide a valid CSI report for the n-th triggered report, if the first uplink symbol to carry the corresponding CSI report(s) including the effect of the timing advance, starts no earlier than at symbol $Z_{ref}$, and if the first uplink symbol to carry the n-th CSI report including the effect of the timing advance, starts no earlier than at symbol $Z'_{ref}(n)$.

Where $Z_{ref}$ is defined as the next uplink symbol with its CP starting after a time duration $T_{proc, CSI}$ after the end of the last symbol of the PDCCH triggering the CSI report(s), and $Z'_{ref}(n)$ is defined as the next uplink symbol with its CP starting after a time duration $T'_{proc, CSI}$ after the end of the last symbol in time of the latest of aperiodic CSI-RS resource for channel measurements, aperiodic CSI-IM for interference measurements, and aperiodic NZP CSI-RS for interference measurement, when aperiodic CSI-RS is used for channel measurement for the n-th triggered CSI report.

The time duration $T_{proc, CSI}$ may be given by a formula: $(Z+d_{2,CSI})(2048+144)\cdot\kappa 2^{-\mu}\cdot T_C$. That is, $T_{proc,CSI}=(Z+d_{2,CSI})(2048+144)\cdot\kappa 2^{-\mu}\cdot T_C$. The time duration $T'_{proc,CSI}$ may be given by a formula: $(Z')(2048+144)\cdot\kappa 2^{-\mu}\cdot T_C$. That is, $T'_{proc,CSI}=(Z')(2048+144)\cdot\kappa 2^{-\mu}\cdot T_C$, where Z, Z' and $\mu$ are defined as specified in the 3GPP TS 38.214, and $d_{2,CSI}$ is the value reported by the UE when the PUSCH is high priority and overlaps with a low priority channel. Otherwise, $d_{2,CSI}=0$.

In some implementations, the UE may not be scheduled with an HP PUSCH without an UL-shared channel (UL-SCH) which overlaps with LP channels.

III. UCI Multiplexing Timeline Extension for HP Channels

In Rel-15 NR, when two or more PUCCHs overlap, the UCI of the overlapping PUCCHs may be multiplexed in a PUCCH following the UCI multiplexing procedure as specified in the 3GPP TS 38.213 V16.1.0, and the other overlapping PUCCHs may be dropped. If the PUCCH determined to multiplex the UCI overlaps with PUSCH(s), the UCI may further be multiplexed in a PUSCH and the PUCCH may be dropped.

A UCI multiplexing timeline may be defined for UCI multiplexing, where any scheduling DCI corresponding to a PUSCH or a PUCCH in the group of overlapping PUSCH and PUCCH should have an ending symbol that ends before a time duration $T_{proc,2}^{mux}$ before the start of the first symbol of the group of overlapping PUSCH and PUCCH, and any PDSCH that has a corresponding PUCCH in the group of overlapping PUSCH and PUCCH should have an ending symbol ends before a time duration $T_{proc,1}^{mux}$ before the start of the first symbol of the group of overlapping PUSCH and PUCCH.

Figure 3:
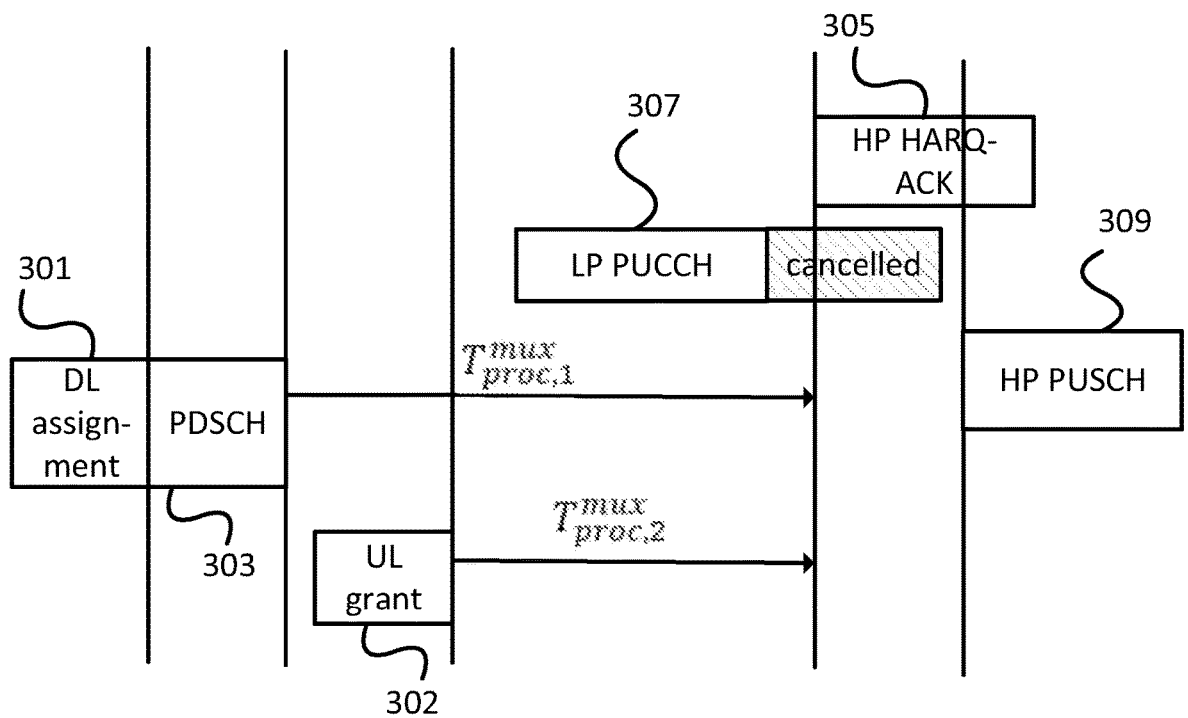
FIG. 3 is a schematic diagram illustrating timeline requirements of Uplink Control Information (UCI) multiplexing for overlapping HP channels according to an example implementation of the present disclosure.

When an HP PUSCH or an HP PUCCH cancels an LP PUSCH or an LP PUCCH, the PDSCH processing procedure time for an HP PUSCH may need to be extended by d2 symbols if the HP PUSCH overlaps with an LP PUCCH and the PUSCH preparation procedure time for an HP PUCCH may need to be extended by d2 symbols if the HP PUCCH overlaps with an LP PUSCH. Similarly, the UCI multiplexing timeline for a group of overlapping HP PUSCH and HP PUCCH that contains an HP PUSCH or an HP PUCCH that cancels an LP PUSCH or an LP PUCCH may need to be extended. FIG. 3 is a schematic diagram illustrating timeline requirements of UCI multiplexing for overlapping HP channels according to an example implementation of the present disclosure. In FIG. 3, a DL assignment 301 schedules a PDSCH 303 which has corresponding HP HARQ-ACK 305 transmitted in an HP PUCCH overlapping with an LP PUCCH 307. An uplink grant 302 schedules an HP PUSCH 309 overlapping with the HP PUCCH carrying the HP HARQ-ACK 305. The end of the PDSCH 303 and the start of HP PUCCH carrying the HP HARQ-ACK 305 should satisfy a UCI multiplexing timeline requirement. For example, the end of the PDSCH 303 and the start of HP PUCCH carrying the HP HARQ-ACK 305 may be separated by an offset greater than a time duration $T_{proc,1}^{mux}$. The UL grant 302 and the start of an HP PUCCH carrying the HP HARQ-ACK 305 should satisfy a UCI multiplexing timeline requirement. For example, the UL grant 302 and the start of an HP PUCCH carrying the HP HARQ-ACK 305 may be separated by an offset greater than a time duration $T_{proc,2}^{mux}$. In this circumstance, since the HP PUCCH carrying the HP HARQ-ACK 305 cancels the transmission of the LP PUCCH 307, the UCI multiplexing timeline requirements (e.g., $T_{proc,1}^{mux}$ and $T_{proc,2}^{mux}$) may need to be extended.

Each of the time durations $T_{proc,1}^{mux}$, $T_{proc,2}^{mux}$, $T_{proc,release}^{mux}$, $T_{proc,CSI}^{mux}$, $Z_{proc,CSI}^{mux}$ for UCI multiplexing timeline for HP channels may be extended by d3 symbols if a group of overlapping HP PUSCH and HP PUCCH cancels LP PUSCH or LP PUCCH transmission. In some implementations, the time durations $T_{proc,1}^{mux}$, $T_{proc,2}^{mux}$, $T_{proc,release}^{mux}$ may be extended by d3 symbols, and the time durations $T_{proc,CSI}^{mux}$, $Z_{proc,CSI}^{mux}$ may be extended by d4 symbols if a group of overlapping HP PUSCH and HP PUCCH cancels LP PUSCH or LP PUCCH transmission.

$T_{proc,1}^{mux}$ may be given by maximum of $\{T_{proc,1}^{mux,1}, \ldots, T_{proc,1}^{mux,i}, \ldots\}$ where for the i-th PDSCH with corresponding HARQ-ACK transmission on a PUCCH which is in the group of overlapping HP PUCCHs and HP PUSCHs which overlaps with LP PUSCHs or LP PUCCHs.

In some implementations, $T_{proc,1}^{mux,i}$ may be given by a formula: $(N_1+d_{1,1}+d3)\cdot(2048+144)\cdot\kappa \cdot 2^{-\mu} \cdot T_C$. That is, $T_{proc,1}^{mux,i}=(N_1+d_{1,1}+d3)\cdot(2048+144)\cdot\kappa \cdot 2^{-\mu} \cdot T_C$, where $d_{1,1}$ is selected for the i-th PDSCH as specified in the 3GPP TS 38.214, $N_1$ is selected based on the UE PDSCH processing capability of the i-th PDSCH and SCS configuration $\mu$, where $\mu$ corresponds to the smallest SCS configuration among the SCS configurations used for the PDCCH scheduling the i-th PDSCH (if any), the i-th PDSCH, the HP PUCCH with corresponding HARQ-ACK transmission for i-th PDSCH, and all PUSCHs and PUCCHs in the group of overlapping PUCCHs and PUSCHs, and d3 is maximum of 1 and the value reported by a UE.

In some implementations, $T_{proc,1}^{mux,i}$ may be given by a formula: $(N_1+d_{1,1}+1+d3)\cdot(2048+144)\cdot\kappa \cdot 2^{-\mu} \cdot T_C$. That is, $T_{proc,1}^{mux,i}=(N_1+d_{1,1}+1+d3)\cdot(2048+144)\cdot\kappa \cdot 2^{-\mu} \cdot T_C$, where $N_1$ is selected based on the UE PDSCH processing capability of the i-th PDSCH and SCS configuration $\mu$, where $\mu$ corresponds to the smallest SCS configuration among the SCS configurations used for the PDCCH scheduling the i-th PDSCH (if any), the i-th PDSCH, the HP PUCCH with corresponding HARQ-ACK transmission for i-th PDSCH, and all PUSCHs and PUCCHs in the group of overlapping PUCCHs and PUSCHs, and $d_{1,1}$, and d3 is the value reported by a UE.

In some implementations, $T_{proc,1}^{mux,i}$ may be given by a formula: $(N_1+d_{1,1}+d3)\cdot(2048+144)\cdot\kappa \cdot 2^{-\mu} \cdot T_C$. That is, $T_{proc,1}^{mux,i}=(N_1+d_{1,1}+d3)\cdot(2048+144)\cdot\kappa \cdot 2^{-\mu} \cdot T_C$, where $d_{1,1}$ is selected for the i-th PDSCH as specified in the 3GPP TS 38.214, $N_1$ is selected based on the UE PDSCH processing capability of the i-th PDSCH and SCS configuration $\mu$, where $\mu$ corresponds to the smallest SCS configuration among the SCS configurations used for the PDCCH scheduling the i-th PDSCH (if any), the i-th PDSCH, the HP PUCCH with corresponding HARQ-ACK transmission for i-th PDSCH, and all HP PUSCHs in the group of overlapping HP PUCCHs and HP PUSCHs, and d3 is maximum of 1 and the value reported by the UE.

In some implementations, $T_{proc,1}^{mux,i}$ may be given by a formula: $(N_1+d_{1,1}+1+d3)\cdot(2048+144)\cdot\kappa \cdot 2^{-\mu} \cdot T_C$. That is, $T_{proc,1}^{mux,i}=(N_1+d_{1,1}+1+d3)\cdot(2048+144)\cdot\kappa \cdot 2^{-\mu} \cdot T_C$, where $N_1$ is selected based on the UE PDSCH processing capability of the i-th PDSCH and SCS configuration $\mu$, $\mu$ corresponds to the smallest SCS configuration among the SCS configurations used for the PDCCH scheduling the i-th PDSCH (if any), the i-th PDSCH, the HP PUCCH with corresponding HARQ-ACK transmission for i-th PDSCH, and all HP PUSCHs in the group of overlapping HP PUCCHs and HP PUSCHs, and $d_{1,1}$, and d3 is the value reported by the UE.

$T_{proc,release}^{mux}$ may be given by maximum of $\{T_{proc,release}^{mux,1}, \ldots, T_{proc,release}^{mux,i} \ldots\}$ where for the i-th PDCCH providing the SPS PDSCH release or the DCI format 1_1 with corresponding HARQ-ACK transmission on an HP PUCCH which is in the group of overlapping HP PUCCHs and HP PUSCHs which overlaps with LP PUSCHs or LP PUCCHs.

In some implementations, $T_{proc,release}^{mux,i}$ may be given by a formula: $(N+d3)\cdot(2048+144)\cdot\kappa \cdot 2^{-\mu} \cdot T_C$. That is, $T_{proc,release}^{mux,i}=(N+d3)\cdot(2048+144)\cdot\kappa \cdot 2^{-\mu} \cdot T_C$, where N is described as specified in the 3GPP TS 38.213 and is selected based on the UE PDSCH processing capability of the i-th SPS PDSCH release or the DCI format 1_1 and SCS configuration $\mu$, $\mu$ corresponds to the smallest SCS configuration among the SCS configurations used for the PDCCH providing the i-th SPS PDSCH release, the HP PUCCH with corresponding HARQ-ACK transmission for i-th SPS PDSCH release or the DCI format 1_1, and all PUSCHs and PUCCHs in the group of overlapping PUCCHs and PUSCHs, and d3 is maximum of 1 and the value reported by the UE.

In some implementations, $T_{proc,release}^{mux,i}$ may be given by a formula: $(N+1+d3)\cdot(2048+144)\cdot\kappa \cdot 2^{-\mu} \cdot T_C$. That is, $T_{proc,release}^{mux,i}=(N+1+d3)\cdot(2048+144)\cdot\kappa \cdot 2^{-\mu} \cdot T_C$, where N is described as specified in the 3GPP TS 38.213 and is selected based on the UE PDSCH processing capability of the i-th SPS PDSCH release or the DCI format 1_1 and SCS configuration $\mu$, $\mu$ corresponds to the smallest SCS configuration among the SCS configurations used for the PDCCH providing the i-th SPS PDSCH release, the HP PUCCH with corresponding HARQ-ACK transmission for i-th SPS PDSCH release or the DCI format 1_1, and all PUSCHs and PUCCHs in the group of overlapping PUCCHs and PUSCHs, and d3 is the value reported by the UE.

In some implementations, $T_{proc,release}^{mux,i}$ may be given by a formula: $(N+d3)\cdot(2048+144)\cdot\kappa \cdot 2^{-\mu} \cdot T_C$. That is, $T_{proc,release}^{mux,i}=(N+d3)\cdot(2048+144)\cdot\kappa \cdot 2^{-\mu} \cdot T_C$, where N is described as specified in the 3GPP TS 38.213 and is selected based on the UE PDSCH processing capability of the i-th SPS PDSCH release or the DCI format 1_1 and SCS configuration $\mu$, $\mu$ corresponds to the smallest SCS configuration among the SCS configurations used for the PDCCH providing the i-th SPS PDSCH release, the HP PUCCH with corresponding HARQ-ACK transmission for i-th SPS PDSCH release or the DCI format 1_1, and all HP PUSCHs in the group of overlapping HP PUCCHs and HP PUSCHs, and d3 is maximum of 1 and the value reported by the UE.

In some implementations, $T_{proc,release}^{mux,i}$ may be given by a formula: $(N+1+d3)\cdot(2048+144)\cdot\kappa \cdot 2^{-\mu} \cdot T_C$. That is, $T_{proc,release}^{mux,i}=(N+1+d3)\cdot(2048+144)\cdot\kappa \cdot 2^{-\mu} \cdot T_C$, where N is described as specified in the 3GPP TS 38.213 and is selected based on the UE PDSCH processing capability of the i-th SPS PDSCH release or the DCI format 1_1 and SCS configuration μ, μ corresponds to the smallest SCS configuration among the SCS configurations used for the PDCCH providing the i-th SPS PDSCH release, the HP PUCCH with corresponding HARQ-ACK transmission for i-th SPS PDSCH release or the DCI format 1_1, and all HP PUSCHs in the group of overlapping HP PUCCHs and HP PUSCHs, and d3 is the value reported by the UE.

$T_{proc,2}^{mux}$ may be given by maximum of $\{T_{proc,2}^{mux,1}, \ldots, T_{proc,2}^{mux,i}\}$ where for the i-th PUSCH which is in the group of overlapping HP PUCCHs and HP PUSCHs which overlaps with LP PUSCHs or LP PUCCHs.

In some implementations, $T_{proc,2}^{mux,i}$ may be given by a formula: $\max((N_2+d_{2,1}+d3)\cdot(2048+144)\cdot\kappa\cdot 2^{-\mu}\cdot T_C, d_{2,2})$. That is, $T_{proc,2}^{mux,i}=\max((N_2+d_{2,1}+d3)\cdot(2048+144)\cdot\kappa\cdot 2^{-\mu}\cdot T_C, d_{2,2})$, where $d_{2,1}$ and $d_{2,2}$ are selected for the i-th HP PUSCH as specified in the 3GPP TS 38.214, $N_2$ is selected based on the UE PUSCH processing capability of the i-th HP PUSCH and SCS configuration μ, where μ corresponds to the smallest SCS configuration among the SCS configurations used for the PDCCH scheduling the i-th HP PUSCH (if any), the PDCCHs scheduling the PDSCHs with corresponding HARQ-ACK transmission on an HP PUCCH which is in the group of overlapping PUCCHs/PUSCHs, and all PUSCHs and PUCCHs in the group of overlapping PUCCHs and PUSCHs, and d3 is maximum of 1 and the value reported by the UE.

In some implementations, $T_{proc,2}^{mux,i}$ may be given by a formula: $\max((N_2+d_{2,1}+1+d3)\cdot(2048+144)\cdot\kappa\cdot 2^{-\mu}\cdot T_C, d_{2,2})$. That is, $T_{proc,2}^{mux,i}=\max((N_2+d_{2,1}+1+d3)\cdot(2048+144)\cdot\kappa\cdot 2^{-\mu}\cdot T_C, d_{2,2})$, where $d_{2,1}$ and $d_{2,2}$ are selected for the i-th HP PUSCH as specified in the 3GPP TS 38.214, $N_2$ is selected based on the UE PUSCH processing capability of the i-th HP PUSCH and SCS configuration μ, μ corresponds to the smallest SCS configuration among the SCS configurations used for the PDCCH scheduling the i-th HP PUSCH (if any), the PDCCHs scheduling the PDSCHs with corresponding HARQ-ACK transmission on an HP PUCCH which is in the group of overlapping PUCCHs/PUSCHs, and all PUSCHs and PUCCHs in the group of overlapping PUCCHs and PUSCHs, and d3 is the value reported by the UE.

In some implementations, $T_{proc,2}^{mux,i}$ may be given by a formula: $\max((N_2+d_{2,1}+d3)\cdot(2048+144)\cdot\kappa\cdot 2^{-\mu}\cdot T_C, d_{2,2})$. That is, $T_{proc,2}^{mux,i}=\max((N_2+d_{2,1}+d3)\cdot(2048+144)\cdot\kappa\cdot 2^{-\mu}\cdot T_C, d_{2,2})$, where $d_{2,1}$ and $d_{2,2}$ are selected for the i-th HP PUSCH as specified in the 3GPP TS 38.214, $N_2$ is selected based on the UE PUSCH processing capability of the i-th HP PUSCH and SCS configuration μ, where μ corresponds to the smallest SCS configuration among the SCS configurations used for the PDCCH scheduling the i-th HP PUSCH (if any), the PDCCHs scheduling the PDSCHs with corresponding HARQ-ACK transmission on an HP PUCCH which is in the group of overlapping PUCCHs/PUSCHs, and all HP PUSCHs in the group of overlapping HP PUCCHs and HP PUSCHs, and d3 is maximum of 1 and the value reported by the UE.

In some implementations, $T_{proc,2}^{mux,i}$ may be given by a formula: $\max((N_2+d_{2,1}+1+d3)\cdot(2048+144)\cdot\kappa\cdot 2^{-\mu}\cdot T_C, d_{2,2})$. That is, $T_{proc,2}^{mux,i}=\max((N_2+d_{2,1}+1+d3)\cdot(2048+144)\cdot\kappa\cdot 2^{-\mu}\cdot T_C, d_{2,2})$, where $d_{2,1}$ and $d_{2,2}$ are selected for the i-th HP PUSCH as specified in the 3GPP TS 38.214, $N_2$ is selected based on the UE PUSCH processing capability of the i-th HP PUSCH and SCS configuration μ, μ corresponds to the smallest SCS configuration among the SCS configurations used for the PDCCH scheduling the i-th HP PUSCH (if any), the PDCCHs scheduling the PDSCHs with corresponding HARQ-ACK transmission on an HP PUCCH which is in the group of overlapping PUCCHs/PUSCHs, and all HP PUSCHs in the group of overlapping HP PUCCHs and HP PUSCHs, and d3 is the value reported by the UE.

If there is an aperiodic CSI report multiplexed in an HP PUSCH in the group of overlapping HP PUCCHs and HP PUSCHs which overlaps with LP PUSCHs or LP PUCCHs, $S_0$ is not before a symbol with CP starting after a time duration $T_{proc,CSI}^{mux}$ after a last symbol of:

any PDCCH with the DCI format scheduling an overlapping HP PUSCH, and any PDCCH scheduling a PDSCH, or SPS PDSCH release, or providing a DCI format 1_1 indicating SCell dormancy with corresponding HARQ-ACK information in an overlapping HP PUCCH in the slot.

In some implementations, $T_{proc,CSI}^{mux}$ may be given by a formula: $\max((Z+d3)\cdot(2048+144)\cdot\kappa\cdot 2^{-\mu}\cdot T_C, d_{2,2})$. That is, $T_{proc,CSI}^{mux}=\max+d3)\cdot(2048+144)\cdot\kappa\cdot 2^{-\mu}\cdot T_C, d_{2,2})$, where μ corresponds to the smallest SCS configuration among the SCS configurations of the PDCCHs, the smallest SCS configuration for the group of the overlapping PUSCHs and PUCCHs, and the smallest SCS configuration of CSI-RS associated with the DCI format scheduling the HP PUSCH with the multiplexed aperiodic CSI report, d3 is the maximum of d and the value reported by the UE, where d=2 for μ=0, 1, d=3 for μ=2 and d=4 for μ=3, d2,2, and Z are defined as specified in the 3GPP TS 38.214, and κ and $T_c$ are defined as specified in the 3GPP TS 38.211.

In some implementations, $T_{proc,CSI}^{mux}$ may be given by a formula: $\max((Z+d+d3)\cdot(2048+144)\cdot\kappa\cdot 2^{-\mu}\cdot T_C, d_{2,2})$. That is, $T_{proc,CSI}^{mux}=\max((Z+d+d3)\cdot(2048+144)\cdot\kappa\cdot 2^{-\mu}\cdot T_C, d_{2,2})$, where μ corresponds to the smallest SCS configuration among the SCS configurations of the PDCCHs, the smallest SCS configuration for the group of the overlapping PUSCHs and PUCCHs, and the smallest SCS configuration of CSI-RS associated with the DCI format scheduling the HP PUSCH with the multiplexed aperiodic CSI report, d3 is the value reported by the UE, d2,2, and Z are defined as specified in the 3GPP TS 38.214, and κ and $T_c$ are defined as specified in the 3GPP TS 38.211.

In some implementations, d3 may be replaced by d4 which may be reported by the UE.

If there is an aperiodic CSI report multiplexed in an HP PUSCH in the group of overlapping HP PUCCHs and HP PUSCHs which overlaps with LP PUSCHs or LP PUCCHs, $S_0$ is not before a symbol with CP starting after a time duration $T_{proc,CSI}^{mux}$ after a last symbol of:

any PDCCH with the DCI format scheduling an overlapping HP PUSCH, and any PDCCH scheduling a PDSCH, or SPS PDSCH release, or providing a DCI format 1_1 indicating SCell dormancy with corresponding HARQ-ACK information in an overlapping HP PUCCH in the slot.

In some implementations, $T_{proc,CSI}^{mux}$ may be given by a formula: max $((Z+d3)\cdot(2048+144)\cdot\kappa\cdot 2^{-\mu}\cdot T_C, d_{2,2})$. That is, $T_{proc,CSI}^{mux}$=max $((Z+d3)\cdot(2048+144)\cdot\kappa\cdot 2^{-\mu}\cdot T_C, d_{2,2})$, where μ corresponds to the smallest SCS configuration among the SCS configurations of the PDCCHs, the smallest SCS configuration for the group of the overlapping HP PUSCHs, and the smallest SCS configuration of CSI-RS associated with the DCI format scheduling the HP PUSCH with the multiplexed aperiodic CSI report, d3 is the maximum of d and the value reported by the UE, where d=2 for μ=0, 1, d=3 for μ=2 and d=4 for μ=3, $d_{2,2}$, and Z are defined in TS 38.214, and κ and $T_c$ are defined in TS 38.211.

In some implementations, $T_{proc,CSI}^{mux}$ may be given by a formula: max $((Z+d+d3)\cdot(2048+144)\cdot\kappa\cdot 2^{-\mu}\cdot T_C, d_{2,2})$. That is, $T_{proc,CSI}^{mux}$=max $((Z+d+d3)\cdot(2048+144)\cdot\kappa\cdot 2^{-\mu}\cdot T_C, d_{2,2})$, where μ corresponds to the smallest SCS configuration among the SCS configurations of the PDCCHs, the smallest SCS configuration for the group of the overlapping HP PUSCHs, and the smallest SCS configuration of CSI-RS associated with the DCI format scheduling the HP PUSCH with the multiplexed aperiodic CSI report, $d_{2,2}$, and Z are defined in TS 38.214, κ and $T_c$ are defined in TS 38.211, and d3 is the value reported by the UE.

If there is one or more aperiodic CSI reports multiplexed on HP PUSCHs in the group of overlapping HP PUCCHs and HP PUSCHs and if symbol $S_0$ is before symbol $Z'_{ref}{}^{mux}$ that is a next uplink symbol with CP starting after a time duration $Z_{proc,CSI}^{mux}$ after the end of the last symbol of:

the last symbol of an aperiodic CSI-RS resource for channel measurements, and the last symbol of an aperiodic CSI-IM used for interference measurements, and the last symbol of an aperiodic NZP CSI-RS for interference measurements, when an aperiodic CSI-RS is used for channel measurement for a triggered CSI report n.

In some implementations, $Z_{proc,CSI}^{mux}$ may be given by a formula: $(Z'+d3)\cdot(2048+144)\cdot\kappa\cdot 2^{-\mu}\cdot T_C$. That is, $Z_{proc,CSI}^{mux}=(Z'+d3)\cdot(2048+144)\cdot\kappa\cdot 2^{-\mu}\cdot T_C$, where the UE is not required to update the CSI report for the triggered CSI report n, Z' is defined as specified in the 3GPP TS 38.214, μ corresponds to the smallest SCS configuration among the SCS configurations of the PDCCHs scheduling the HP PUSCHs, the smallest SCS configuration of aperiodic CSI-RSs associated with DCI formats provided by the PDCCHs triggering the aperiodic CSI reports, and the smallest SCS configuration of the overlapping PUCCHs and PUSCHs, and d3 is the maximum of d and the value reported by the UE, d=2 for μ=0, 1, d=3 for μ=2 and d=4 for μ=3.

In some implementations, $Z_{proc,CSI}^{mux}$ may be given by a formula: $(Z'+d+d3)\cdot(2048+144)\cdot\kappa\cdot 2^{-\mu}\cdot T_C$. That is, $Z_{proc,CSI}^{mux}=(Z'+d+d3)\cdot(2048+144)\cdot\kappa\cdot 2^{-\mu}\cdot T_C$, where the UE is not required to update the CSI report for the triggered CSI report n, Z' is defined as specified in the 3GPP TS 38.214, μ corresponds to the smallest SCS configuration among the SCS configurations of the PDCCHs scheduling the HP PUSCHs, the smallest SCS configuration of aperiodic CSI-RSs associated with DCI formats provided by the PDCCHs triggering the aperiodic CSI reports, and the smallest SCS configuration of the overlapping PUCCHs and PUSCHs, and d3 is the value reported by the UE.

If there is one or more aperiodic CSI reports multiplexed on HP PUSCHs in the group of overlapping HP PUCCHs and HP PUSCHs and if symbol $S_0$ is before symbol $Z'_{ref}{}^{mux}$ that is a next uplink symbol with CP starting after a time duration $Z_{proc,CSI}^{mux}=(Z'+d3)\cdot(2048+144)\cdot\kappa\cdot 2^{-\mu}\cdot T_C$ after the end of the last symbol of:

the last symbol of an aperiodic CSI-RS resource for channel measurements, and the last symbol of an aperiodic CSI-IM used for interference measurements, and the last symbol of an aperiodic NZP CSI-RS for interference measurements, when an aperiodic CSI-RS is used for channel measurement for a triggered CSI report n.

In some implementations, $Z_{proc,CSI}^{mux}$ may be given by a formula: $(Z'+d3)\cdot(2048+144)\cdot\kappa\cdot 2^{-\mu}\cdot T_C$. That is, $Z_{proc,CSI}^{mux}=(Z'+d3)\cdot(2048+144)\cdot\kappa\cdot 2^{-\mu}\cdot T_C$, where the UE is not required to update the CSI report for the triggered CSI report n, Z' is defined in TS 38.214, μ corresponds to the smallest SCS configuration among the SCS configurations of the PDCCHs scheduling the HP PUSCHs, the smallest SCS configuration of aperiodic CSI-RSs associated with DCI formats provided by the PDCCHs triggering the aperiodic CSI reports, and the smallest SCS configuration of the overlapping HP PUCCHs and HP PUSCHs, and d3 is the maximum of d and the value reported by the UE, d=2 for μ=0, 1, d=3 for μ=2 and d=4 for μ=3.

In some implementations, $Z_{proc,CSI}^{mux}$ may be given by a formula: $(Z'+d+d3)(2048+144)\cdot\kappa\cdot 2^{-\mu}\cdot T_C$. That is, $Z_{proc,CSI}^{mux}=+d+d3)\cdot(2048+144)\cdot\kappa\cdot 2^{-\mu}\cdot T_C$, where the UE is not required to update the CSI report for the triggered CSI report n, Z' is defined in TS 38.214, μ corresponds to the smallest SCS configuration among the SCS configurations of the PDCCHs scheduling the HP PUSCHs, the smallest SCS configuration of aperiodic CSI-RSs associated with DCI formats provided by the PDCCHs triggering the aperiodic CSI reports, and the smallest SCS configuration of the overlapping HP PUCCHs and HP PUSCHs, and d3 is the value reported by the UE.

In some implementations, d3 may be replaced by d4 which may be reported by the UE. d3 may be replaced by d2. d3 may be replaced by d1. Reporting of d3 and determination of the SCS of d3 may be similar to the reporting of d1 and d2 and determination of the SCS of d1 and d2.

IV. UE Processing Capability for Cancelling LP Transmission

There are two sets of $N_2$ values for the $T_{proc,2}$ calculation. One set may correspond to UE processing capability 1 and the other set may correspond to UE processing capability 2. For calculation of the cancellation timeline for cancelling an LP transmission, a set of the $N_2$ values corresponding to UE processing capability 2 may be used dependent on the following conditions (1) and (2) being satisfied:

Condition (1): All processingType2Enabled are set to enable in the PDSCH-ServingCellConfig of the serving cells in which there are one or more PDSCHs that have corresponding PUCCHs in the overlapping group.

Condition (2): All processingType2Enabled are set to enable in the PUSCH-ServingCellConfig of the serving cells in which there are one or more PUSCHs in the overlapping group.

In Rel-15 NR, some UEs may be able to process a PDSCH with UE processing capability 2 only if the PDSCH has limited number of scheduled resource blocks (RBs). Specifically, for UE processing capability 2 with scheduling limitation when μIPDSCH=1, if the scheduled RB allocation exceeds 136 RBs, the UE may default to capability 1 processing time. The UE may skip decoding a number of PDSCHs with last symbol within 10 symbols before symbol $S_0$, if any of those PDSCHs are scheduled with more than 136 RBs with 30 kHz SCS and following capability 1 processing time, where symbol $S_0$ is the start of a PDSCH that is scheduled to follow capability 2.

The current specified cancellation timeline may not take into account the scheduled number of RBs for the corresponding PDSCHs of the PUCCHs in the overlapping group. Since the UE may default to UE processing capability 1 when a PDSCH is scheduled with more than 136 RBs, the UE may not be able to cancel the corresponding PUCCH satisfying the cancellation timeline of UE processing capability 2.

The UE processing capability for cancelling an LP transmission may consider the amount of scheduled RBs of PDSCH corresponding to LP PUCCH when the UE reported pdsch-ProcessingType2-Limited.

$N_2$ for the $T_{proc,2}$ calculation may be determined based on following conditions (1) and (2):

Condition (1): If the overlapping group consists of a high priority PUCCH carrying HARQ-ACK and low priority PUCCHs and/or PUSCHs and if processingType2Enabled of PDSCH-ServingCellConfig is set to enable for the serving cell with the high priority DCI format and for all serving cells corresponding to the low priority HARQ-ACK information transmission in the overlapping group and if each scheduled PDSCH is with X RBs or less on the serving cell for which UE reported pdsch-ProcessingType2-Limited and if processingType2Enabled of PUSCH-ServingCellConfig is set to enable for the serving cell with the corresponding low priority PUSCHs in the overlapping group, $N_2$ is 5 for m=0, 5.5 for m=1 and 11 for m=2, otherwise, $N_2$ is 10 for m=0, 12 for m=1, 23 for m=2 and 36 for m=3. X may equal to 136. X may be reported by a UE.

Condition (2): If the overlapping group consists of a high priority PUSCH and low priority PUCCHs and/or PUSCHs and if processingType2Enabled of PUSCH-ServingCellConfig is set to enable for the serving cell with the PUSCHs in the overlapping group and if processingType2Enabled of PDSCH-ServingCellConfig is set to enable for all serving cells corresponding to the low priority HARQ-ACK information transmission in the overlapping group and if each scheduled PDSCH is with X RBs or less on the serving cell for which UE reported pdsch-ProcessingType2-Limited, $N_2$ is 5 for m=0, 5.5 for m=1 and 11 for m=2; otherwise, $N_2$ is 10 for m=0, 12 for m=1, 23 for m=2 and 36 for m=3. X may equal to 136. X may be reported by the UE.

In some implementations, $N_2$ for the $T_{proc,2}$ calculation may be determined based on the following conditions (1) and (2).

Condition (1): If the overlapping group consists of a high priority PUCCH carrying HARQ-ACK and low priority PUCCHs and/or PUSCHs and if processingType2Enabled of PDSCH-ServingCellConfig is set to enable for the serving cell with the high priority DCI format and for all serving cells corresponding to the low priority HARQ-ACK information transmission in the overlapping group and if pdsch-ProcessingType2 is reported for the serving cell with the high priority DCI format and for all serving cells corresponding to the low priority HARQ-ACK information transmission in the overlapping group and if processingType2Enabled of PUSCH-ServingCellConfig is set to enable for the serving cell with the corresponding low priority PUSCHs in the overlapping group, $N_2$ is 5 for m=0, 5.5 for m=1 and 11 for m=2, otherwise, $N_2$ is 10 for m=0, 12 for m=1, 23 for m=2 and 36 for m=3.

Condition (2): If the overlapping group consists of a high priority PUSCH and low priority PUCCHs and/or PUSCHs and if processingType2Enabled of PUSCH-ServingCellConfig is set to enable for the serving cell with the PUSCHs in the overlapping group and if processingType2Enabled of PDSCH-ServingCellConfig is set to enable for all serving cells corresponding to the low priority HARQ-ACK information transmission in the overlapping group and if pdsch-ProcessingType2 is reported for the serving cell with the high priority DCI format and for all serving cells corresponding to the low priority HARQ-ACK information transmission in the overlapping group, $N_2$ is 5 for m=0, 5.5 for m=1 and 11 for m=2; otherwise, $N_2$ is 10 for m=0, 12 for m=1, 23 for m=2 and 36 for m=3.

In some implementations, for UE processing capability 2 with scheduling limitation when μPDSCH=1, if the scheduled RB allocation exceeds X RBs, the UE may default to capability 1 processing time. The UE may skip decoding a number of PDSCHs if the corresponding PUCCH is cancelled and the cancellation timeline follows UE processing capability 2. X may equal to 136. X may be reported by the UE.

Figure 4:
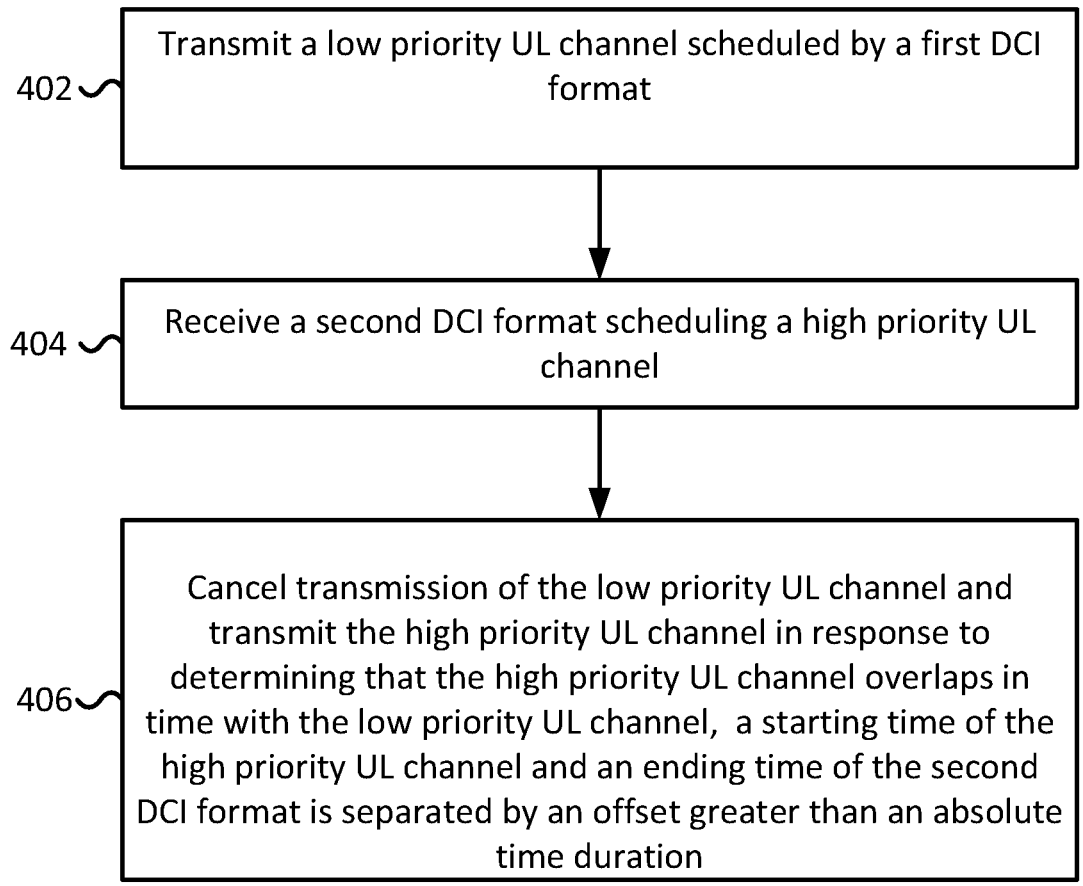
FIG. 4 is a flowchart illustrating a method performed by a UE for scheduling a timeline for cancelling UL transmission according to an example implementation of the present disclosure.

FIG. 4 is a flowchart illustrating a method 400 performed by a UE for scheduling a timeline for cancelling UL transmission according to an example implementation of the present disclosure. Although actions 402, 404 and 406 are illustrated as separate actions represented as independent blocks in FIG. 4, these separately illustrated actions should not be construed as necessarily order dependent. The order in which the actions are performed in FIG. 4 is not intended to be construed as a limitation, and any number of the disclosed blocks may be combined in any order to implement the method, or an alternate method. Moreover, each of actions 402, 404 and 406 may be performed independent of other actions, and can be omitted in some implementations of the present disclosure.

In action 402, the UE may transmit a low priority UL channel scheduled by a first downlink control information (DCI) format.

In action 404, the UE may receive a second DCI format scheduling a high priority UL channel.

In action 406, the UE may cancel transmission of the low priority UL channel and transmit the high priority UL channel in response to determining that the high priority UL channel overlaps in time with the low priority UL channel, a starting time of the high priority UL channel and an ending time of the second DCI format is separated by an offset greater than an absolute time duration. The absolute time duration includes a first absolute time duration and a second absolute time duration. The first absolute time duration is determined based on a RRC configuration and the second absolute time duration is determined based on UE capability information. The absolute time duration may be $T_{proc,2}$+d1, the first absolution time may be $T_{proc,2}$ and the second absolution time may be d1. The UE capability information may include a number of symbols, and the second absolute time duration may be a length of the number of symbols with a smallest SCS among an SCS of the first DCI format, an SCS of the second DCI format, an SCS of the low priority UL channel, and an SCS of the high priority UL channel.

The high priority UL channel may be a PUSCH, and the first absolute time duration may be determined based on a first type of the processing time of the PUSCH if the RRC configuration includes a configuration of the first type of the processing time of the PUSCH for a first serving cell of the high priority UL channel, and a configuration of the first type of the processing time of a PDSCH for a second serving cell of the low priority UL channel. The first type of the processing time of the PUSCH may be UE processing capability 2 of the PUSCH, and the first type of the processing time of the PDSCH may be UE processing capability 2 of the PDSCH. That is, the first absolute time duration may be determined based on the processing time according to UE processing capability 2, if high layer parameter processingType2Enabled in PUSCH-ServingCellConfig is configured for the first serving cell of the high priority UL channel and set to enable, and high layer parameter processingType2Enabled in PDSCH-ServingCellConfig is configured for the second serving cell of the low priority UL channel and set to enable.

The high priority UL channel may be a PUCCH, and the first absolute time duration may be determined based on a first type of a processing time of a PUSCH if the RRC configuration includes configuration of a first type of the processing time of a PDSCH for a first serving cell of the high priority UL channel, and configuration of the first type of the processing time of the PDSCH for a second serving cell of the low priority UL channel or the first type of the processing time of the PUSCH for a third serving cell of the low priority UL channel. The first type of the processing time of the PUSCH may be UE processing capability 2 of the PUSCH, and the first type of the processing time of the PDSCH may be UE processing capability 2 of the PDSCH. That is, the first absolute time duration may be determined based on the processing time according to UE processing capability 2, if high layer parameter processingType2Enabled in PDSCH-ServingCellConfig is configured for the first serving cell of the high priority UL channel and set to enable, and high layer parameter processingType2Enabled in PDSCH-ServingCellConfig is configured for the second serving cell of the low priority UL channel and set to enable or high layer parameter processingType2Enabled in PUSCH-ServingCellConfig is configured for the third serving cell of the low priority UL channel and set to enable.

Figure 5:
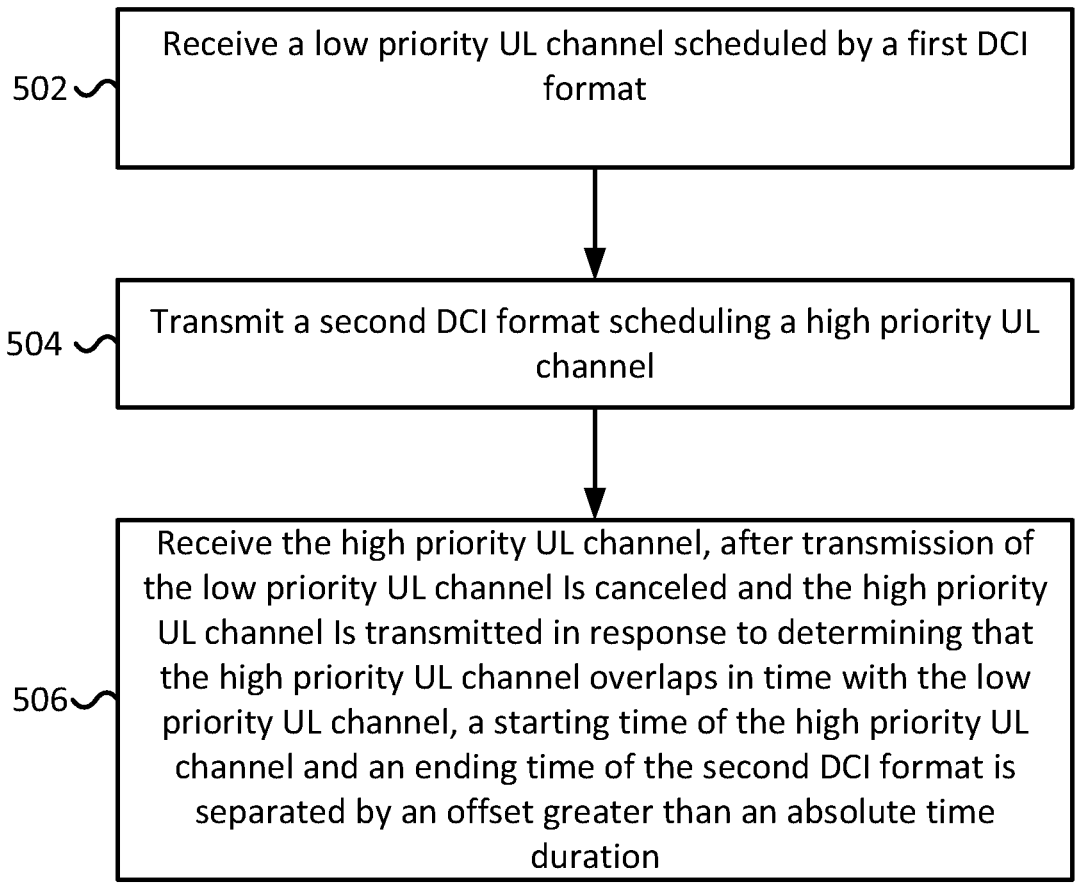
FIG. 5 is a flowchart illustrating a method performed by a base station (BS) for scheduling a timeline for cancelling UL transmission according to an example implementation of the present disclosure.

FIG. 5 is a flowchart illustrating a method 500 performed by a BS for scheduling a timeline for cancelling UL transmission according to an example implementation of the present disclosure. Although actions 502, 504 and 506 are illustrated as separate actions represented as independent blocks in FIG. 5, these separately illustrated actions should not be construed as necessarily order dependent. The order in which the actions are performed in FIG. 5 is not intended to be construed as a limitation, and any number of the disclosed blocks may be combined in any order to implement the method, or an alternate method. Moreover, each of actions 502, 504 and 506 may be performed independent of other actions, and can be omitted in some implementations of the present disclosure.

In action 502, the BS may receive a low priority UL channel scheduled by a first downlink control information (DCI) format.

In action 504, the BS may transmit a second DCI format scheduling a high priority UL channel.

In action 506, the BS may receive the high priority UL channel, after transmission of the low priority UL channel is canceled and the high priority UL channel is transmitted in response to determining that the high priority UL channel overlapping in time with the low priority UL channel, a starting time of the high priority UL channel and an ending time of the second DCI format is separated by an offset greater than an absolute time duration. The absolute time duration includes a first absolute time duration and a second absolute time duration, and the first absolute time duration is determined based on a RRC configuration and the second absolute time duration is determined based on UE capability information. The absolute time duration may be $T_{proc,2}+d1$, the first absolution time may be $T_{proc,2}$ and the second absolution time may be d1. The UE capability information may include a number of symbols, and the second absolute time duration may be a length of the number of symbols with a smallest SCS among an SCS of the first DCI format, an SCS of the second DCI format, an SCS of the low priority UL channel, and an SCS of the high priority UL channel.

The high priority UL channel may be a PUSCH, and the first absolute time duration may be determined based on a first type of the processing time of the PUSCH if the RRC configuration includes a configuration of the first type of the processing time of the PUSCH for a first serving cell of the high priority UL channel, and a configuration of the first type of the processing time of a PDSCH for a second serving cell of the low priority UL channel. The first type of the processing time of the PUSCH may be UE processing capability 2 of the PUSCH, and the first type of the processing time of the PDSCH may be UE processing capability 2 of the PDSCH. That is, the first absolute time duration may be determined based on the processing time according to UE processing capability 2, if high layer parameter processingType2Enabled in PUSCH-ServingCellConfig is configured for the first serving cell of the high priority UL channel and set to enable, and high layer parameter processingType2Enabled in PDSCH-ServingCellConfig is configured for the second serving cell of the low priority UL channel and set to enable.

The high priority UL channel may be a PUCCH, and the first absolute time duration may be determined based on a first type of a processing time of a PUSCH if the RRC configuration includes a configuration of a first type of the processing time of a PDSCH for a first serving cell of the high priority UL channel, and a configuration of the first type of the processing time of the PDSCH for a second serving cell of the low priority UL channel or the first type of the processing time of the PUSCH for a third serving cell of the low priority UL channel. The first type of the processing time of the PUSCH may be UE processing capability 2 of the PUSCH, and the first type of the processing time of the PDSCH may be UE processing capability 2 of the PDSCH. That is, the first absolute time duration may be determined based on the processing time according to UE processing capability 2, if high layer parameter processingType2Enabled in PDSCH-ServingCellConfig is configured for the first serving cell of the high priority UL channel and set to enable, and high layer parameter processingType2Enabled in PDSCH-ServingCellConfig is configured for the second serving cell of the low priority UL channel and set to enable or high layer parameter processingType2Enabled in PUSCH-ServingCellConfig is configured for the third serving cell of the low priority UL channel and set to enable.

The proposed methods in the present disclosure can ensure low latency transmission of high priority data by allowing a low priority channel to be cancelled by a high priority channel. The proposed methods in the present disclosure also reduce UE complexity and provide flexibility in UE implementation by extending the required timeline for a high priority channel transmission which cancels a low priority transmission based on UE capability.

Figure 6:
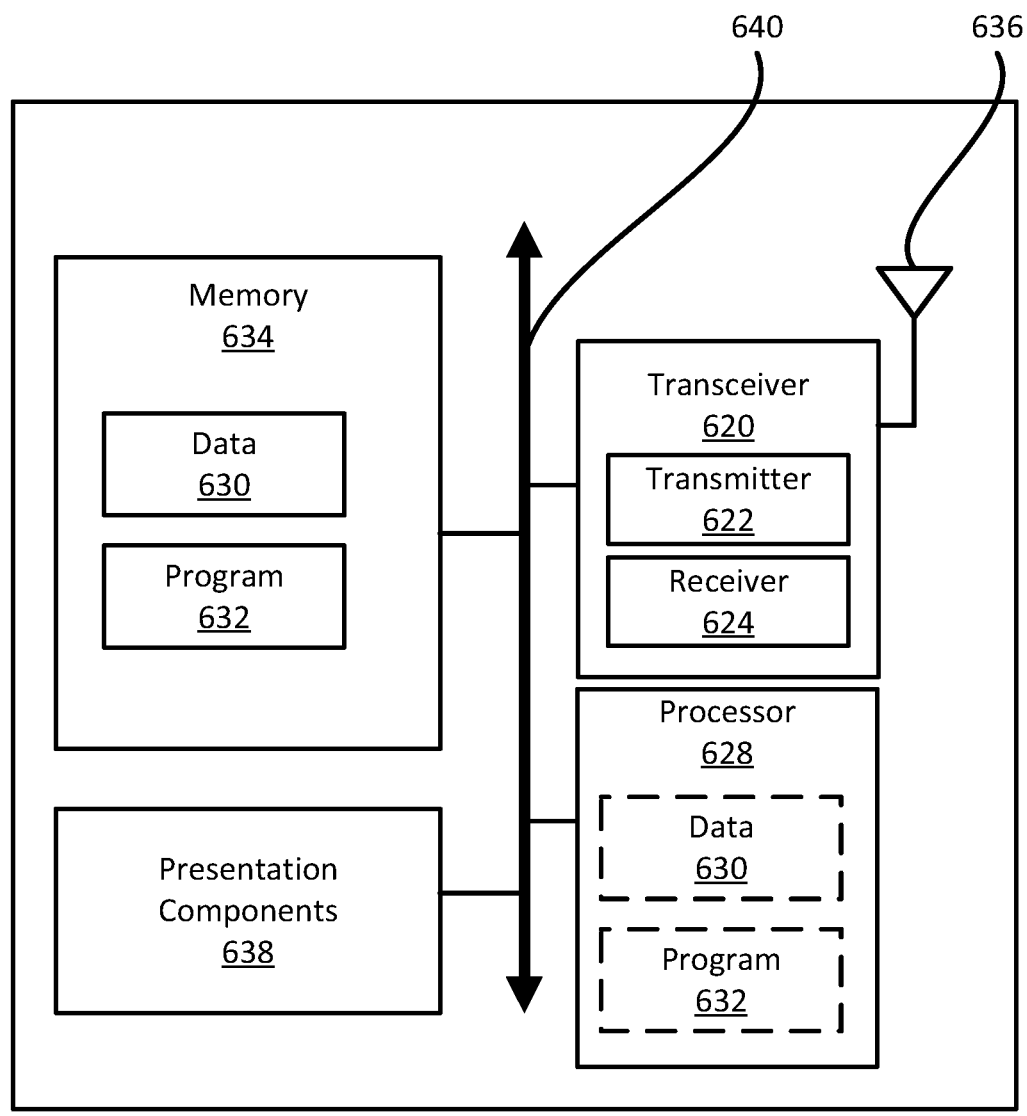
FIG. 6 is a block diagram illustrating a node for wireless communication according to an example implementation of the present disclosure.

FIG. 6 is a block diagram illustrating a node 600 for wireless according to an example implementation of the present disclosure. As illustrated in FIG. 6, a node 600 may include a transceiver 620, a processor 628, a memory 634, one or more presentation components 638, and at least one antenna 636. The node 600 may also include a radio frequency (RF) spectrum band module, a BS communications module, a network communications module, and a system communications management module, Input/Output (I/O) ports, I/O components, and a power supply (not illustrated in FIG. 6).

Each of the components may directly or indirectly communicate with each other over one or more buses 640. The node 600 may be a UE or a BS that performs various functions disclosed with reference to FIGS. 4 and 5.

The transceiver 620 has a transmitter 622 (e.g., transmitting/transmission circuitry) and a receiver 624 (e.g., receiving/reception circuitry) and may be configured to transmit and/or receive time and/or frequency resource partitioning information. The transceiver 620 may be configured to transmit in different types of subframes and slots including but not limited to usable, non-usable and flexibly usable subframes and slot formats. The transceiver 620 may be configured to receive data and control channels.

The node 600 may include a variety of computer-readable media. Computer-readable media may be any available media that may be accessed by the node 600 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 634 may include computer-storage media in the form of volatile and/or non-volatile memory. The memory 634 may be removable, non-removable, or a combination thereof. Example memory may include solid-state memory, hard drives, optical-disc drives, etc. As illustrated in FIG. 6, the memory 634 may store a computer-readable and/or computer-executable program 632 (e.g., software codes) that are configured to, when executed, cause the processor 628 to perform various functions disclosed herein, for example, with reference to FIGS. 4 and 5. Alternatively, the program 632 may not be directly executable by the processor 628 but may be configured to cause the node 600 (e.g., when compiled and executed) to perform various functions disclosed herein.

The processor 628 (e.g., having processing circuitry) may include an intelligent hardware device, e.g., a Central Processing Unit (CPU), a microcontroller, an ASIC, etc. The processor 628 may include memory. The processor 628 may process the data 630 and the program 632 received from the memory 634, and information transmitted and received via the transceiver 620, the base band communications module, and/or the network communications module. The processor 628 may also process information to send to the transceiver 620 for transmission via the antenna 636 to the network communications module for transmission to a CN.

One or more presentation components 638 may present data indications to a person or another device. Examples of presentation components 638 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a user equipment (UE) for scheduling a timeline for cancelling uplink (UL) transmission, the method comprising:
   transmitting a low priority UL channel scheduled by a first downlink control information (DCI) format;
   receiving a second DCI format scheduling a high priority UL channel; and
   cancelling transmission of the low priority UL channel and transmitting the high priority UL channel in response to determining that the high priority UL channel overlaps in time with the low priority UL channel,
   wherein a starting time of the high priority UL channel and an ending time of the second DCI format are separated by an offset greater than an absolute time duration.

2. The method of claim 1, wherein:
   the absolute time duration includes a first absolute time duration and a second absolute time duration, and
   the first absolute time duration is determined based on a radio resource control (RRC) configuration and the second absolute time duration is determined based on UE capability information.

3. The method of claim 2, wherein the UE capability information includes a number of symbols, and the second absolute time duration is a length of the number of symbols with a smallest subcarrier spacing (SCS) among an SCS of the first DCI format, an SCS of the second DCI format, an SCS of the low priority UL channel, and an SCS of the high priority UL channel.

4. The method of claim 2, wherein:
the high priority UL channel is a physical uplink shared channel (PUSCH),
the first absolute time duration is determined based on a first type of the processing time of the PUSCH if the RRC configuration includes a configuration of the first type of the processing time of the PUSCH for a first serving cell of the high priority UL channel, and a configuration of the first type of the processing time of a physical downlink shared channel (PDSCH) for a second serving cell of the low priority UL channel,
the first type of the processing time of the PUSCH is UE processing capability 2 of the PUSCH, and
the first type of the processing time of the PDSCH is UE processing capability 2 of the PDSCH.

5. The method of claim 2, wherein:
the high priority UL channel is a physical uplink control channel (PUCCH),
the first absolute time duration is determined based on a first type of a processing time of a physical uplink shared channel (PUSCH) if the RRC configuration includes a configuration of a first type of the processing time of a physical downlink shared channel (PDSCH) for a first serving cell of the high priority UL channel, and a configuration of the first type of the processing time of the PDSCH for a second serving cell of the low priority UL channel or the first type of the processing time of the PUSCH for a third serving cell of the low priority UL channel,
the first type of the processing time of the PUSCH is UE processing capability 2 of the PUSCH, and
the first type of the processing time of the PDSCH is UE processing capability 2 of the PDSCH.

6. A user equipment (UE) for scheduling a timeline for cancelling uplink (UL) transmission, the UE comprising:
one or more non-transitory computer-readable media having computer-executable instructions embodied thereon; and
at least one processor coupled to the one or more non-transitory computer-readable media, the at least one processor is configured to execute the computer-executable instructions to:
transmit a low priority UL channel scheduled by a first downlink control information (DCI) format;
receive a second DCI format scheduling a high priority UL channel; and
cancel transmission of the low priority UL channel and transmit the high priority UL channel in response to determining that the high priority UL channel overlaps in time with the low priority UL channel,
wherein a starting time of the high priority UL channel and an ending time of the second DCI format are separated by an offset greater than an absolute time duration.

7. The UE of claim 6, wherein:
the absolute time duration includes a first absolute time duration and a second absolute time duration, and
the first absolute time duration is determined based on a radio resource control (RRC) configuration and the second absolute time duration is determined based on UE capability information.

8. The UE of claim 7, wherein the UE capability information includes a number of symbols, and the second absolute time duration is a length of the number of symbols with a smallest subcarrier spacing (SCS) among an SCS of the first DCI format, an SCS of the second DCI format, an SCS of the low priority UL channel, and an SCS of the high priority UL channel.

9. The UE of claim 7, wherein:
the high priority UL channel is a physical uplink shared channel (PUSCH),
the first absolute time duration is determined based on a first type of the processing time of the PUSCH if the RRC configuration includes a configuration of the first type of the processing time of the PUSCH for a first serving cell of the high priority UL channel, and a configuration of the first type of the processing time of a physical downlink shared channel (PDSCH) for a second serving cell of the low priority UL channel,
the first type of the processing time of the PUSCH is UE processing capability 2 of the PUSCH, and
the first type of the processing time of the PDSCH is UE processing capability 2 of the PDSCH.

10. The UE of claim 7, wherein:
the high priority UL channel is a physical uplink control channel (PUCCH),
the first absolute time duration is determined based on a first type of a processing time of a physical uplink shared channel (PUSCH) if the RRC configuration includes a configuration of a first type of the processing time of a physical downlink shared channel (PDSCH) for a first serving cell of the high priority UL channel, and a configuration of the first type of the processing time of the PDSCH for a second serving cell of the low priority UL channel or the first type of the processing time of the PUSCH for a third serving cell of the low priority UL channel,
the first type of the processing time of the PUSCH is UE processing capability 2 of the PUSCH, and
the first type of the processing time of the PDSCH is UE processing capability 2 of the PDSCH.

11. A method performed by a base station for scheduling a timeline for cancelling uplink (UL) transmission, the method comprising:
receiving a low priority UL channel scheduled by a first downlink control information (DCI) format;
transmitting a second DCI format scheduling a high priority UL channel; and
receiving the high priority UL channel, after transmission of the low priority UL channel is canceled and the high priority UL channel is transmitted in response to determining that the high priority UL channel overlaps in time with the low priority UL channel,
wherein a starting time of the high priority UL channel and an ending time of the second DCI format are separated by an offset greater than an absolute time duration.

12. The method of claim 11, wherein:
the absolute time duration includes a first absolute time duration and a second absolute time duration, and
the first absolute time duration is determined based on a radio resource control (RRC) configuration and the second absolute time duration is determined based on UE capability information.

13. The method of claim 12, wherein the UE capability information includes a number of symbols, and the second absolute time duration is a length of the number of symbols with a smallest subcarrier spacing (SCS) among an SCS of the first DCI format, an SCS of the second DCI format, an SCS of the low priority UL channel, and an SCS of the high priority UL channel.

14. The method of claim 12, wherein:
the high priority UL channel is a physical uplink shared channel (PUSCH),
the first absolute time duration is determined based on a first type of the processing time of the PUSCH if the RRC configuration includes a configuration of the first type of the processing time of the PUSCH for a first serving cell of the high priority UL channel, and a configuration of the first type of the processing time of a physical downlink shared channel (PDSCH) for a second serving cell of the low priority UL channel,
the first type of the processing time of the PUSCH is UE processing capability 2 of the PUSCH,
the first type of the processing time of the PDSCH is UE processing capability 2 of the PDSCH.

15. The method of claim 12, wherein:
the high priority UL channel is a physical uplink control channel (PUCCH),
the first absolute time duration is determined based on a first type of a processing time of a physical uplink shared channel (PUSCH) if the RRC configuration includes a configuration of a first type of the processing time of a physical downlink shared channel (PDSCH) for a first serving cell of the high priority UL channel, and a configuration of the first type of the processing time of the PDSCH for a second serving cell of the low priority UL channel or the first type of the processing time of the PUSCH for a third serving cell of the low priority UL channel,
the first type of the processing time of the PUSCH is UE processing capability 2 of the PUSCH, and
the first type of the processing time of the PDSCH is UE processing capability 2 of the PDSCH.

* * * * *